US011936237B2

(12) United States Patent
Kano et al.

(10) Patent No.: US 11,936,237 B2
(45) Date of Patent: Mar. 19, 2024

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventors: Masamichi Kano, Chuo-ku (JP); Hidenobu Tajima, Chuo-ku (JP); Yousuke Hayashi, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 87 days.

(21) Appl. No.: 17/768,754

(22) PCT Filed: Sep. 17, 2020

(86) PCT No.: PCT/JP2020/035282
§ 371 (c)(1),
(2) Date: Apr. 13, 2022

(87) PCT Pub. No.: WO2022/059138
PCT Pub. Date: Mar. 24, 2022

(65) Prior Publication Data
US 2023/0275453 A1    Aug. 31, 2023

(51) Int. Cl.
*H02J 9/06*        (2006.01)
*H02J 3/00*        (2006.01)
(Continued)

(52) U.S. Cl.
CPC ............ *H02J 9/062* (2013.01); *H02J 3/0073* (2020.01); *H02J 9/08* (2013.01); *H02M 1/0025* (2021.05);
(Continued)

(58) Field of Classification Search
CPC ............ H02J 9/062; H02J 3/0073; H02J 9/08; H02M 1/14; H02M 1/32; H02M 5/4585; H02M 1/0025
See application file for complete search history.

(56) References Cited

U.S. PATENT DOCUMENTS

2006/0212737 A1    9/2006  Chandra et al.
2018/0212460 A1*   7/2018  Shibata .................. H02J 9/062
2021/0126485 A1    4/2021  Abe

FOREIGN PATENT DOCUMENTS

CN    1419728 A    5/2003
JP    6533357 B1   6/2019

OTHER PUBLICATIONS

International Search Report dated Nov. 2, 2020 in PCT/JP2020/035282 filed on Sep. 17, 2020, 2 pages.
(Continued)

*Primary Examiner* — Ryan Johnson
(74) *Attorney, Agent, or Firm* — Oblon, McClelland, Maier & Neustadt, L.L.P.

(57) ABSTRACT

In an uninterruptible power supply apparatus, AC current, which includes a feedback component having a value corresponding to deviation between terminal-to-terminal voltage of a capacitor and reference voltage, and a feed forward component obtained by multiplying load current by a gain, is passed into a converter such that the terminal-to-terminal voltage of the capacitor becomes the reference voltage. The gain is set to a first gain in an inverter power feed mode and a bypass power feed mode, and the gain is set to a second gain smaller than the first gain in a switching period of switching between the inverter power feed mode and the bypass power feed mode, to prevent the terminal-to-terminal voltage of the capacitor from exceeding an upper limit voltage in a lap power feed mode.

14 Claims, 15 Drawing Sheets

(51) Int. Cl.
*H02J 9/08* (2006.01)
*H02M 1/00* (2006.01)
*H02M 1/14* (2006.01)
*H02M 1/32* (2007.01)
*H02M 5/458* (2006.01)

(52) U.S. Cl.
CPC .............. *H02M 1/14* (2013.01); *H02M 1/32* (2013.01); *H02M 5/4585* (2013.01)

(56) References Cited

OTHER PUBLICATIONS

Office Action dated Dec. 12, 2023 in Indian Patent Application No. 202217022389, citing reference Nos. 1 and 15 therein.

* cited by examiner

UNINTERRUPTIBLE POWER SUPPLY APPARATUS

TECHNICAL FIELD

The present invention relates to an uninterruptible power supply apparatus, and more particularly to an uninterruptible power supply apparatus having an inverter power feed mode in which AC power is supplied from an inverter to a load, a bypass power feed mode in which AC power is supplied from a bypass AC power supply to the load, and a lap power feed mode in which AC power is supplied from both of the inverter and the bypass AC power supply to the load.

BACKGROUND ART

For example, Japanese Patent No. 6533357 (PTL 1) discloses an uninterruptible power supply apparatus having an inverter power feed mode, a bypass power feed mode, and a lap power feed mode. This uninterruptible power supply apparatus includes a rectifier that converts first AC voltage supplied from a commercial AC power supply to DC voltage, a capacitor that smooths DC output voltage from the rectifier, an inverter that converts terminal-to-terminal voltage of the capacitor to second AC voltage, a first switch having one terminal receiving the second AC voltage and the other terminal connected to a load, and a second switch having one terminal receiving third AC voltage supplied from a bypass AC power supply and the other terminal connected to the load.

In the inverter power feed mode, the first switch is turned on and the second switch is turned off. In the bypass power feed mode, the second switch is turned on and the first switch is turned off. In the lap power feed mode, both the first and second switches are turned on. The lap power feed mode is executed in a switching period of switching between the inverter power feed mode and the bypass power feed mode.

CITATION LIST

Patent Literature
PTL 1: Japanese Patent No. 6533357

SUMMARY OF INVENTION

Technical Problem

Generally, in such an uninterruptible power supply apparatus, AC current including a feedback component having a value corresponding to deviation between reference voltage and terminal-to-terminal voltage of a capacitor is passed from a commercial AC power supply to a rectifier, to thereby maintain the terminal-to-terminal voltage of the capacitor at the reference voltage. In this method, the feedback component needs to be controlled at high speed in order to maintain the terminal-to-terminal voltage of the capacitor at the reference voltage even when load current changes suddenly. Unfortunately, the high-speed control of the feedback component results in unstable control.

To solve this problem, a method may be employed in which AC current including a feedback component and a feed forward component having a value corresponding to the load current is passed from the commercial AC power supply to the rectifier, to thereby maintain the terminal-to-terminal voltage of the capacitor at the reference voltage. According to this method, the control can be stabilized by low-speed control of the feedback component, and a sudden change in load current can be addressed by introduction of the feed forward component.

In this method, however, when the load current is supplied from both of a bypass AC power supply and an inverter in a lap power feed mode, output from the rectifier becomes greater than output from the inverter, causing an increase in the terminal-to-terminal voltage of the capacitor. When the terminal-to-terminal voltage of the capacitor exceeds an upper limit voltage, the operation of the uninterruptible power supply apparatus is stopped, and the operation of a load is stopped.

A main object of the present invention is therefore to provide an uninterruptible power supply apparatus capable of stably controlling terminal-to-terminal voltage of a capacitor, and preventing the terminal-to-terminal voltage of the capacitor from exceeding an upper limit voltage.

Solution to Problem

An uninterruptible power supply apparatus according to the present invention includes a rectifier, a capacitor, an inverter, a first switch, a second switch, a first current detector, a second current detector, a first controller, and a second controller. The rectifier converts first AC voltage supplied from a first AC power supply to DC voltage. The capacitor smooths DC output voltage from the rectifier. The inverter converts terminal-to-terminal voltage of the capacitor to second AC voltage. The first switch has a first terminal receiving the second AC voltage and a second terminal connected to a load. The second switch has a first terminal receiving third AC voltage supplied from a second AC power supply and a second terminal connected to the load. The first current detector detects AC current flowing between the first AC power supply and the rectifier. The second current detector detects load current. The first controller controls the first and second switches. The second controller controls the rectifier based on results of detection by the first and second current detectors. In a first mode in which the second AC voltage is supplied to the load, the first controller turns on the first switch and turns off the second switch. In a second mode in which the third AC voltage is supplied to the load, the first controller turns on the second switch and turns off the first switch. In a switching period in which one mode of the first and second modes is switched to the other mode, the first controller turns on the first and second switches and executes a third mode in which the second and third AC voltages are supplied to the load.

In the first and second modes, the second controller passes first AC current from the first AC power supply to the rectifier such that the terminal-to-terminal voltage of the capacitor becomes a first reference voltage, the first AC current including a first feedback component having a value corresponding to deviation between the first reference voltage and the terminal-to-terminal voltage of the capacitor, and a first feed forward component obtained by multiplying the load current by a first gain. In the switching period, the second controller passes second AC current from the first AC power supply to the rectifier such that the terminal-to-terminal voltage of the capacitor becomes a second reference voltage, the second AC current including a second feedback component having a value corresponding to deviation between the second reference voltage and the terminal-to-terminal voltage of the capacitor, and a second feed forward component obtained by multiplying the load current by a second gain smaller than the first gain. The second controller is configured to prevent the terminal-to-terminal voltage of the capacitor from exceeding an upper limit voltage higher than the first and second reference voltages.

Advantageous Effects of Invention

In the uninterruptible power supply apparatus according to the present invention, since the AC current including the feedback component and the feed forward component is passed into the rectifier, the control can be stabilized by low-speed control of the feedback component, and a sudden change in load current can be addressed by the feed forward component. In addition, since the feed forward component is reduced in the switching period, the terminal-to-terminal voltage of the capacitor can be prevented from exceeding the upper limit voltage in the third mode.

DESCRIPTION OF EMBODIMENTS

First Embodiment

Figure 1:
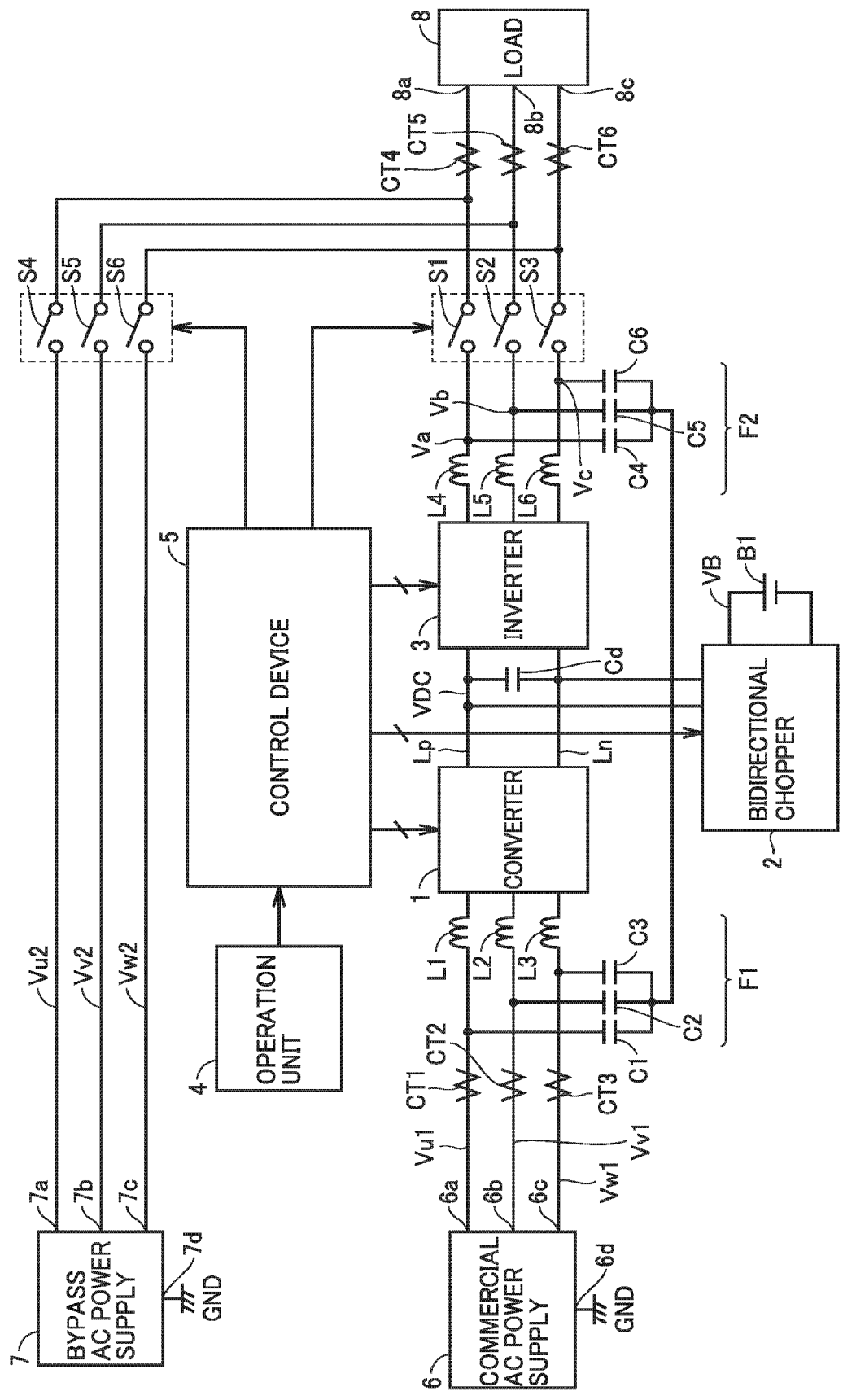
FIG. 1 is a circuit block diagram showing a configuration of an uninterruptible power supply apparatus according to a first embodiment of the present invention.

FIG. 1 is a circuit block diagram showing a configuration of an uninterruptible power supply apparatus according to a first embodiment of the present invention. In FIG. 1, this uninterruptible power supply apparatus includes capacitors C1 to C6 and Cd, reactors L1 to L6, current detectors CT1 to CT6, a converter 1, a DC positive bus Lp, a DC negative bus Ln, a bidirectional chopper 2, an inverter 3, switches S1 to S6, an operation unit 4, and a control device 5.

This uninterruptible power supply apparatus receives three-phase AC power with a commercial frequency from a commercial AC power supply 6 and a bypass AC power supply 7 and supplies three-phase AC power with a commercial frequency to a load 8. Commercial AC power supply 6 (first AC power supply) outputs three-phase AC voltages Vu1, Vv1, and Vw1 (first AC voltage) to AC output terminals 6a to 6c, respectively. A neutral point terminal 6d of commercial AC power supply 6 receives ground voltage GND.

Instantaneous values of three-phase AC voltages Vu1, Vv1, and Vw1 are detected by control device 5. Control device 5 detects whether a power failure of commercial AC power supply 6 has occurred, based on AC output voltages Vu1, Vv1, and Vw1 of commercial AC power supply 6.

Bypass AC power supply 7 (second AC power supply) outputs three-phase AC voltages Vu2, Vv2, and Vw2 (second AC voltage) to AC output terminals 7a to 7c, respectively. A neutral point terminal 7d of bypass AC power supply 7 receives ground voltage GND. Instantaneous values of three-phase AC voltages Vu2, Vv2, and Vw2 are detected by control device 5. AC input terminals 8a to 8c of load 8 receive three-phase AC voltage from the uninterruptible power supply apparatus. Load 8 is driven by three-phase AC power supplied from the uninterruptible power supply apparatus.

Capacitors C1 to C3 each have one electrode connected to the corresponding one of AC output terminals 6a to 6c of commercial AC power supply 6 and have the other electrodes connected to each other. Reactors L1 to L3 each have one terminal connected to the corresponding one of AC output terminals 6a to 6c of commercial AC power supply 6 and have the other terminals respectively connected to three input nodes of converter 1.

Capacitors C1 to C3 and reactors L1 to L3 constitute an AC filter F1. AC filter F1 is a low pass filter, allows AC current with a commercial frequency to flow from commercial AC power supply 6 to converter 1, and prevents a signal with a switching frequency from flowing from converter 1 to commercial AC power supply 6. Current detectors CT1 to CT3 detect AC currents I1 to I3 flowing through reactors L1 to L3, respectively, and apply a signal indicating a detected value to control device 5.

The positive-side output node of converter 1 is connected to the positive-side input node of inverter 3 through DC positive bus Lp. The negative-side output node of converter 1 is connected to the negative-side input node of inverter 3 through DC negative bus Ln. Capacitor Cd is connected between buses Lp and Ln and smooths DC voltage VDC between buses Lp and Ln. An instantaneous value of DC voltage VDC is detected by control device 5.

Converter 1 is controlled by control device 5 and converts three-phase AC power from commercial AC power supply 6 to DC power when three-phase AC power is supplied normally from commercial AC power supply 6 (in a sound state of commercial AC power supply 6). DC power generated by converter 1 is supplied to bidirectional chopper 2 and inverter 3 through buses Lp and Ln.

When supply of three-phase AC power from commercial AC power supply 6 is stopped (at the time of a power failure of commercial AC power supply 6), the operation of converter 1 is stopped. AC filter F1 and converter 1 correspond to an embodiment of "rectifier" that converts three-phase AC power from commercial AC power supply 6 to DC power. Current detectors CT1 to CT3 correspond to an embodiment of "first current detector" that detects AC current flowing from commercial AC power supply 6 to the rectifier.

Bidirectional chopper 2 is controlled by control device 5, stores DC power generated by converter 1 in battery B1 in a sound state of commercial AC power supply 6, and supplies DC power in battery B1 to inverter 3 through buses Lp and Ln in response to occurrence of a power failure of commercial AC power supply 6. An instantaneous value of terminal-to-terminal voltage VB of battery B1 is detected by control device 5.

Inverter 3 is controlled by control device 5 and converts DC power supplied from converter 1 and bidirectional chopper 2 to three-phase AC power with a commercial frequency.

Each of three output nodes of inverter 3 is connected to one terminal of the corresponding one of reactors L4 to L6. The other terminal of each of reactors L4 to L6 is connected to one terminal of the corresponding one of switches S1 to S3, and the other terminals of switches S1 to S3 are respectively connected to three AC input terminals 8a to 8c of load 8. Switches S1 to S3 correspond to an embodiment of "first switch." One electrode of each of capacitors C4 to C6 is connected to the other terminal of the corresponding one of reactors L4 to L6, and the other electrodes of capacitors C4 to C6 are connected together to the other electrodes of capacitors C1 to C3.

Capacitors C4 to C6 and reactors L4 to L6 constitute an AC filter F2. AC filter F2 is a low pass filter, allows AC current with a commercial frequency to flow from inverter 3 to load 8, and prevents a signal with a switching frequency from flowing from inverter 3 to load 8. In other words, AC filter F2 converts three-phase rectangular wave voltage output from inverter 3 to sinusoidal three-phase AC voltages Va, Vb, and Vc.

Inverter 3 and AC filter F2 correspond to an embodiment of "inverter" that converts terminal-to-terminal voltage VDC of capacitor Cd to three-phase AC voltages Va to Vc. Instantaneous values of three-phase AC voltages Va to Vc are detected by control device 5.

Switches S4 to S6 each have one terminal connected to the corresponding one of AC output terminals 7a to 7c of bypass AC power supply 7 and have the other terminals respectively connected to AC input terminals 8a to 8c of load 8. Switches S1 to S6 are controlled by control device 5. Switches S4 to S6 correspond to an embodiment of "second switch."

Current detector CT4 detects AC current I4 flowing between the other terminals of switches S1, S4 and AC input terminal 8a of load 8, and applies a signal indicating a detected value to control device 5. Current detector CT5 detects AC current I5 flowing between the other terminals of switches S2, S5 and AC input terminal 8b of load 8, and applies a signal indicating a detected value to control device 5. Current detector CT6 detects AC current I6 flowing between the other terminals of switches S3, S6 and AC input terminal 8c of load 8, and applies a signal indicating a detected value to control device 5. Current detectors CT4 to CT6 correspond to an embodiment of "second current detector" that detects load currents I4 to I6.

In an inverter power feed mode (first mode) in which three-phase AC power generated by inverter 3 is supplied to load 8, control device 5 turns on switches S1 to S3 and turns off switches S4 to S6.

In a bypass power feed mode (second mode) in which three-phase AC power from bypass AC power supply 7 is supplied to load 8, control device 5 turns off switches S1 to S3 and turns on switches S4 to S6. In a lap power feed mode (third mode) in which three-phase AC power from both of inverter 3 and bypass AC power supply 7 is supplied to load 8, control device 5 turns on switches S1 to S6.

Operation unit 4 (selector) includes a plurality of buttons operated by a user of the uninterruptible power supply apparatus and an image display unit presenting a variety of information. The user can operate operation unit 4 to power on and off the uninterruptible power supply apparatus and select one mode of an automatic operation mode, the bypass power feed mode, and the inverter power feed mode.

Control device 5 controls the entire uninterruptible power supply apparatus based on a signal from operation unit 4, AC output voltages Vu1, Vv1, and Vw1 of commercial AC power supply 6, AC input currents I1 to I3, terminal-to-terminal voltage VDC of capacitor Cd, terminal-to-terminal voltage VB of battery B1, load currents I4 to I6, AC output voltages Va to Vc, and AC output voltages Vu2, Vv2, and Vw2 of bypass AC power supply 7, and the like.

That is, control device 5 controls converter 1 based on AC input currents I1 to I3, terminal-to-terminal voltage VDC of capacitor Cd, load currents I4 to I6, and the like. In the inverter power feed mode and the bypass power feed mode, control device 5 passes three-phase AC currents I1 to I3, which include a first feedback component having a value corresponding to deviation ΔVDC=VDCr1−VDC between reference voltage VDCr1 and terminal-to-terminal voltage VDC of capacitor Cd, and a first feed forward component obtained by multiplying load currents I4 to I6 by a gain K1 (first gain: for example, 1.0), from commercial AC power supply 6 to converter 1, such that terminal-to-terminal voltage VDC of capacitor Cd becomes reference voltage VDCr1 (first reference voltage).

In a switching period in which one mode of the inverter power feed mode and the bypass power feed mode is switched to the other mode, control device 5 passes three-phase AC currents I1 to I3, which include a second feedback component having a value corresponding to deviation ΔVDC=VDCr2−VDC between reference voltage VDCr2 and terminal-to-terminal voltage VDC of capacitor Cd, and a second feed forward component obtained by multiplying load currents I4 to I6 by a gain K2 (second gain: for example, 0.7) smaller than gain K1, from commercial AC power supply 6 to converter 1, such that terminal-to-terminal voltage VDC of capacitor Cd becomes reference voltage VDCr2 (second reference voltage) higher than reference voltage VDCr1.

The controlling of converter 1 such that terminal-to-terminal voltage VDC of capacitor Cd becomes reference voltage VDCr2 higher than reference voltage VDCr1 in the switching period is to prevent circulating current from flowing between commercial AC power supply 6 and bypass AC power supply 7.

Reference voltage VDCr1 is set to a voltage lower than a voltage twice the peak values of three-phase AC voltages Vu1, Vv1, Vw1 of commercial AC power supply 6. Reference voltage VDCr2 is set to a voltage equal to or higher than the voltage twice the peak values of three-phase AC voltages Vu1, Vv1, Vw1 of commercial AC power supply 6. The relation between reference voltages VDCr1, VDCr2 and the circulating current will be described in detail later (FIGS. 2 to 7).

The passing of three-phase AC currents I1 to I3 including the feed forward component obtained by multiplying load currents I4 to I6 by gain K to converter 1 is to increase the response speed of converter 1 to fluctuations in load currents I4 to I6. The introduction of this feed forward component can allow for low-speed control of the feedback component, to stabilize the control.

Figure 8:
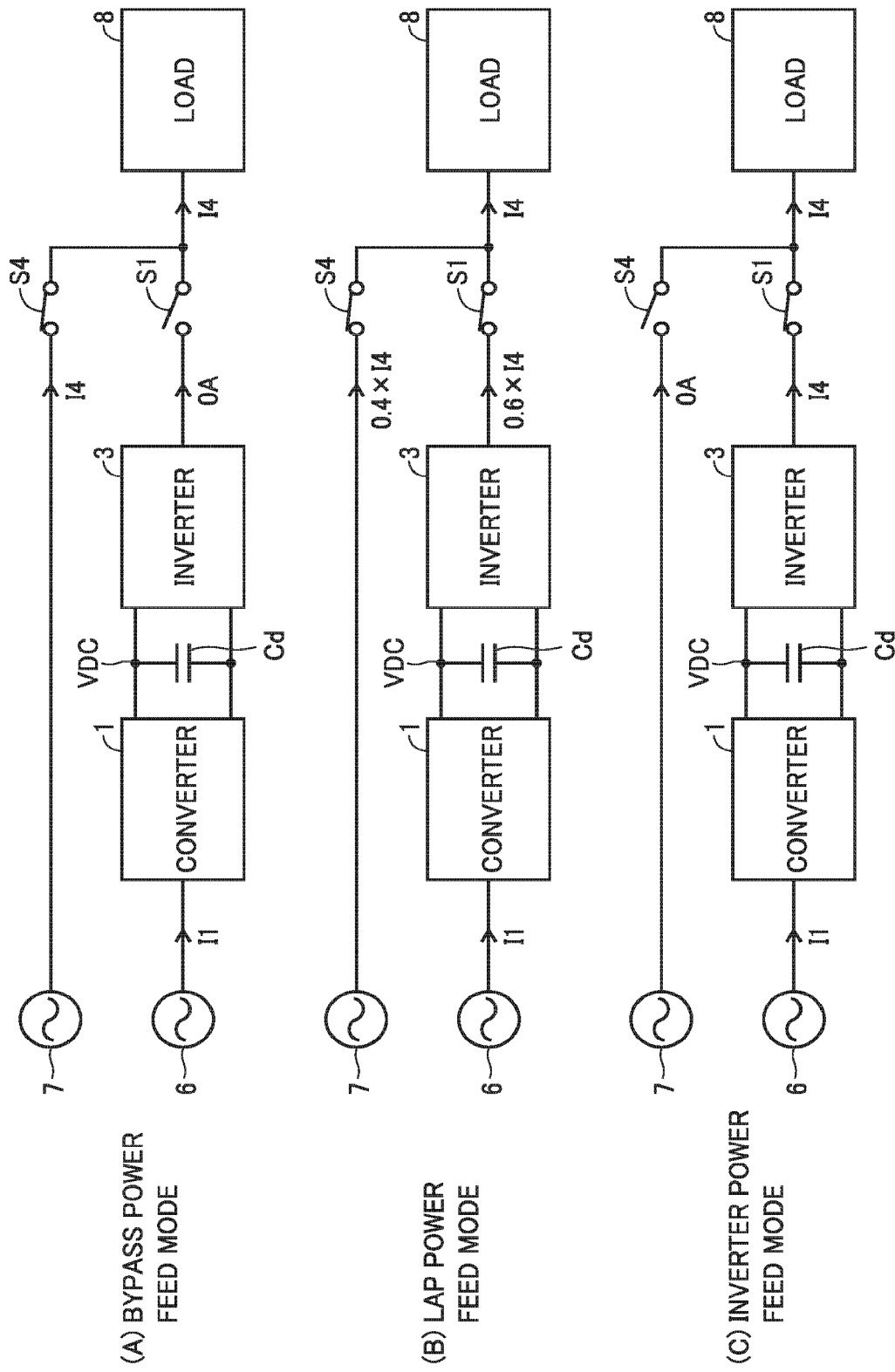
FIG. 8 is a circuit block diagram for explaining problems in the lap power feed mode.

The passing of three-phase AC currents I1 to I3 including the second feed forward component obtained by multiplying load currents I4 to I6 by gain K2 smaller than gain K1 to converter 1 in the switching period is to prevent input to converter 1 (that is, output from converter 1) from becoming greater than output from inverter 3, and causing terminal-to-terminal voltage VDC of capacitor Cd to exceed upper limit voltage VDCH higher than reference voltages VDCr1 and VDCr2, in the lap power feed mode. When terminal-to-terminal voltage VDC of capacitor Cd exceeds upper limit voltage VDCH, the operation of the uninterruptible power supply apparatus is stopped and the operation of load 8 is stopped. The reason for the increase in terminal-to-terminal voltage VDC of capacitor Cd in the lap power feed mode will be described later (FIG. 8).

Control device 5 controls bidirectional chopper 2 such that terminal-to-terminal voltage VB of battery B1 becomes reference voltage VBr in a sound state of commercial AC power supply 6, and controls bidirectional chopper 2 such that terminal-to-terminal voltage VDC of capacitor Cd becomes reference voltage VDCr1 at the time of a power failure of commercial AC power supply 6. Further, control device 5 controls inverter 3 such that AC output voltages Va to Vc of inverter 3 become AC output voltages Vu2, Vv2, and Vw2 of bypass AC power supply 7.

The operation of this uninterruptible power supply apparatus will now be described briefly. When the automatic operation mode is selected using operation unit 4 in a sound state of commercial AC power supply 6, three-phase AC currents I1 to I3 including the first feedback component and the first feed forward component are passed from commercial AC power supply 6 to converter 1, such that terminal-to-terminal voltage VDC of capacitor Cd becomes reference voltage VDCr1. The passing of the first feed forward component to converter 1 can allow for stable control of converter 1, and high-speed control of converter 1 in response to fluctuations in load currents I4 to I6.

Bidirectional chopper 2 is controlled such that terminal-to-terminal voltage VB of battery B1 becomes reference voltage VBr, and inverter 3 is controlled such that AC output voltages Va to Vc become AC output voltages Vu2, Vv2, and Vw2, respectively, of bypass AC power supply 7.

Furthermore, switches S1 to S3 are turned on and switches S4 to S6 are turned off, and inverter 3 is connected to load 8 through AC filter F2 and switches S1 to S3. AC output voltages Va to Vc are then supplied to load 8 through switches S1 to S3 to drive load 8.

When a power failure of commercial AC power supply 6 occurs, the operation of converter 1 is stopped, bidirectional chopper 2 is controlled such that terminal-to-terminal voltage VDC of capacitor Cd becomes reference voltage VDCr1, and inverter 3 is controlled such that AC output voltages Va to Vc become AC output voltages Vu2, Vv2, and Vw2, respectively, of bypass AC power supply 7.

When DC power in battery B1 is consumed and terminal-to-terminal voltage VB of battery B1 reaches a lower limit voltage, the operation of bidirectional chopper 2 and inverter 3 is stopped. Thus, even when a power failure of commercial AC power supply 6 occurs, the operation of load 8 can be continued for a period until terminal-to-terminal voltage VB of battery B1 reaches the lower limit voltage.

When the inverter power feed mode is selected using operation unit 4 in a sound state of commercial AC power supply 6, converter 1 is controlled such that terminal-to-terminal voltage VDC of capacitor Cd becomes reference voltage VDCr1, and bidirectional chopper 2 is controlled such that terminal-to-terminal voltage VB of battery B1 becomes reference voltage VBr, in the same manner as in the automatic operation mode. Inverter 3 is controlled such that AC output voltages Va to Vc become AC output voltages Vu2, Vv2, and Vw2, respectively, of bypass AC power supply 7, switches S1 to S3 are turned on and switches S4 to S6 are turned off.

When the bypass power feed mode is selected using operation unit 4 in the inverter power feed mode, three-phase AC currents I1 to I3 including the second feedback component and the second feed forward component are passed from commercial AC power supply 6 to converter 1, such that terminal-to-terminal voltage VDC of capacitor Cd becomes reference voltage VDCr2 higher than reference voltage VDCr1.

When VDC=VDCr2 is reached, the lap power feed mode is executed for a predetermined period of time, all of switches S1 to S6 are turned on, and three-phase AC power is supplied from both of inverter 3 and bypass AC power supply 7 to load 8. At this point of time, since VDC=VDCr2 is attained, circulating current does not flow through the uninterruptible power supply apparatus. In addition, the passing of the second feed forward component smaller than the first feed forward component to converter 1 can prevent terminal-to-terminal voltage VDC of capacitor Cd from exceeding upper limit voltage VDCH.

When the lap power feed mode ends, switches S1 to S3 are turned off and only switches S4 to S6 are turned on. Converter 1 is controlled so that terminal-to-terminal voltage VDC of capacitor Cd is lowered to reference voltage VDCr1, and the switching from the inverter power feed mode to the bypass power feed mode is completed. In the bypass power feed mode, three-phase AC power is supplied from bypass AC power supply 7 to load 8 through switches S4 to S6 to drive load 8. In the bypass power feed mode, for example, repair or routine check of converter 1, bidirectional chopper 2, inverter 3, battery B1, etc. is performed.

When the inverter power feed mode is selected using operation unit 4 in the bypass power feed mode, three-phase AC currents I1 to I3 including the second feedback component and the second feed forward component are passed from commercial AC power supply 6 to converter 1, such that terminal-to-terminal voltage VDC of capacitor Cd becomes reference voltage VDCr2 higher than reference voltage VDCr1.

When VDC=VDCr2 is reached, the lap power feed mode is executed for a predetermined period of time, all of switches S1 to S6 are turned on, and three-phase AC power is supplied from both of inverter 3 and bypass AC power supply 7 to load 8. At this point of time, since VDC=VDCr2 is attained, circulating current does not flow through the uninterruptible power supply apparatus. In addition, the passing of the second feed forward component smaller than the first feed forward component to converter 1 can prevent terminal-to-terminal voltage VDC of capacitor Cd from exceeding upper limit voltage VDCH.

When the lap power feed mode ends, switches S4 to S6 are turned off, only switches S1 to S3 are turned on, terminal-to-terminal voltage VDC of capacitor Cd is lowered to reference voltage VDCr1 by converter 1, and the switching from the bypass power feed mode to the inverter power feed mode is completed.

Figure 2:
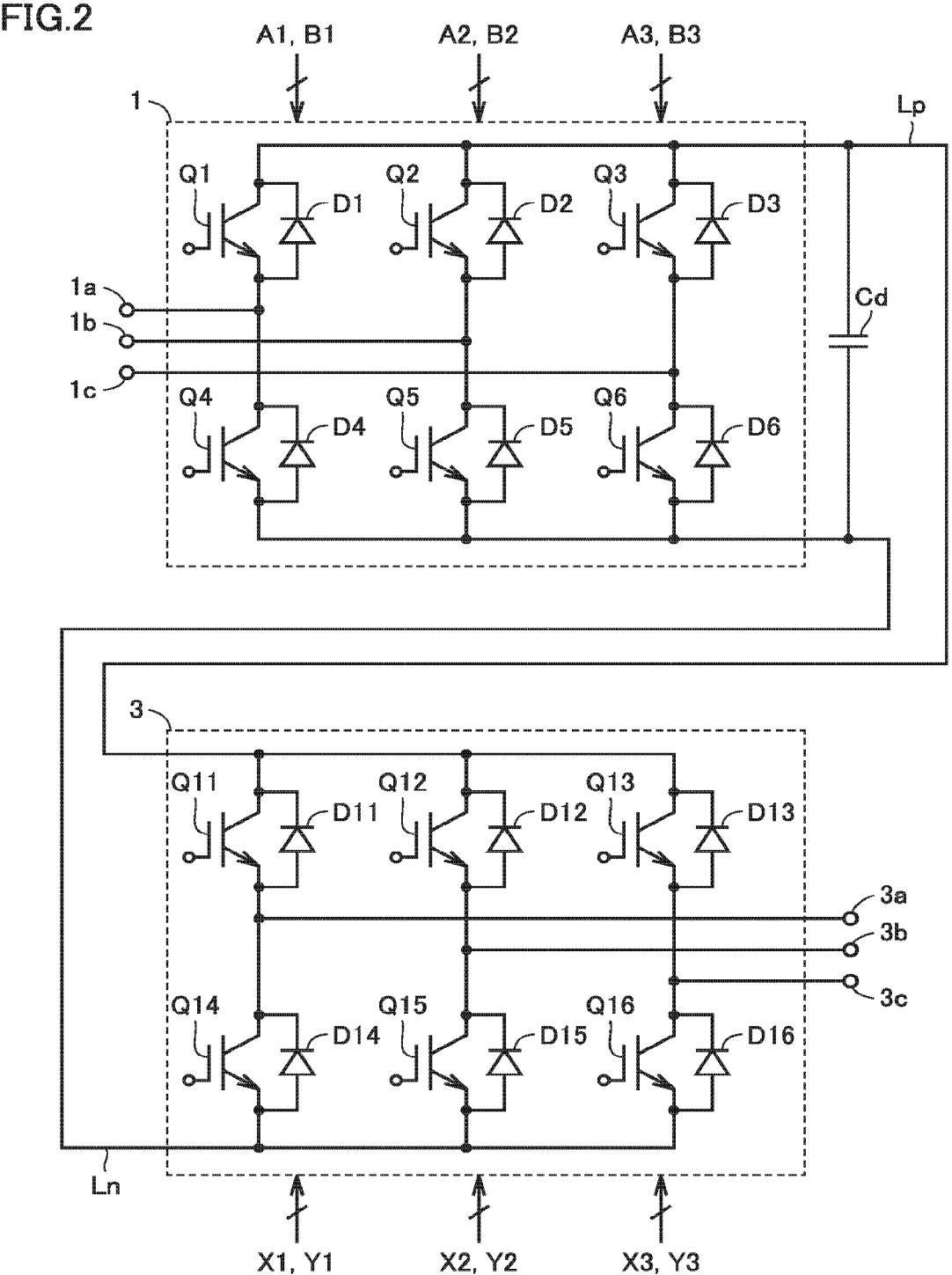
FIG. 2 is a circuit diagram showing a configuration of a converter and an inverter shown in FIG. 1.

The relation between circulating current flowing through such an uninterruptible power supply apparatus and reference voltages VDCr1, VDCr2 will now be described in detail. FIG. 2 is a circuit diagram showing a configuration of converter 1 and inverter 3. In FIG. 2, converter 1 includes IGBTs (Insulated Gate Bipolar Transistors) Q1 to Q6 and diodes D1 to D6. The IGBTs constitute a switching element. The collectors of IGBTs Q1 to Q3 are connected together to DC positive bus Lp, and the emitters thereof are respectively connected to input nodes 1a, 1b, and 1c.

Input nodes 1a, 1b, and 1c are respectively connected to the other terminals of reactors L1 to L3 (FIG. 1). The collectors of IGBTs Q4 to Q6 are respectively connected to input nodes 1a, 1b, and 1c, and the emitters thereof are connected together to DC negative bus Ln. Diodes D1 to D6 are respectively connected in anti-parallel with IGBTs Q1 to Q6.

IGBTs Q1 and Q4 are respectively controlled by gate signals A1 and B1, IGBTs Q2 and Q5 are respectively controlled by gate signals A2 and B2, and IGBTs Q3 and Q6 are respectively controlled by gate signals A3 and B3. Gate signals B1, B2, and B3 are inversion signals of gate signals A1, A2, and A3, respectively.

IGBTs Q1 to Q3 turn on when gate signals A1, A2, and A3 are brought to "H" level, respectively, and turn off when gate signals A1, A2, and A3 are brought to "L" level, respectively. IGBTs Q4 to Q6 turn on when gate signals B1, B2, and B3 are brought to "H" level, respectively, and turn off when gate signals B1, B2, and B3 are brought to "L" level, respectively.

Each of gate signals A1, B1, A2, B2, A3, and B3 is a pulse signal train and a PWM (Pulse Width Modulation) signal. The phase of gate signals A1, B1, the phase of gate signals A2, B2, and the phase of gate signals A3, B3 are basically shifted from each other by 120 degrees. Gate signals A1, B1, A2, B2, A3, and B3 are generated by control device 5. For example, when the level of AC input voltage Vu1 is higher than the level of AC input voltage Vv1, IGBTs Q1 and Q5 are turned on, and current flows from input node 1a to input node 1b through IGBT Q1, DC positive bus Lp, capacitor Cd, DC negative bus Ln, and IGBT Q5 to charge capacitor Cd.

Conversely, when the level of AC input voltage Vv1 is higher than the level of AC input voltage Vu1, IGBTs Q2 and Q4 are turned on, and current flows from input node 1b to input node 1a through IGBT Q2, DC positive bus Lp, capacitor Cd, DC negative bus Ln, and IGBT Q4 to charge capacitor Cd. This is the same in other cases.

Each of IGBTs Q1 to Q6 is turned on and off at a predetermined timing by gate signals A1, B1, A2, B2, A3, and B3, and the ON time of each of IGBTs Q1 to Q6 is adjusted, whereby three-phase AC voltage applied to input nodes 6a to 6c can be converted to DC voltage VDC (terminal-to-terminal voltage of capacitor Cd).

Inverter 3 includes IGBTs Q11 to Q16 and diodes D11 to D16. The IGBTs constitute a switching element. The collectors of IGBTs Q11 to Q13 are connected together to DC positive bus Lp, and the emitters thereof are respectively connected to output nodes 3a, 3b, and 3c. Each of output nodes 3a, 3b, and 3c is connected to one terminal of the corresponding one of reactors L4 to L6 (FIG. 1). The collectors of IGBTs Q14 to Q16 are respectively connected to output nodes 3a, 3b, and 3c, and the emitters thereof are connected together to DC negative bus Ln. Diodes D11 to D16 are respectively connected in anti-parallel with IGBTs Q11 to Q16.

IGBTs Q11 and Q14 are respectively controlled by gate signals X1 and Y1, IGBTs Q12 and Q15 are respectively controlled by gate signals X2 and Y2, and IGBTs Q13 and Q16 are respectively controlled by gate signals X3 and Y3. Gate signals Y1, Y2, and Y3 are inversion signals of gate signals X1, X2, and X3, respectively.

IGBTs Q11 to Q13 turn on when gate signals X1, X2, and X3 are brought to "H" level, respectively, and turn off when gate signals X1, X2, and X3 are brought to "L" level, respectively. IGBTs Q14 to Q16 turn on when gate signals Y1, Y2, and Y3 are brought to "H" level, respectively, and turn off when gate signals Y1, Y2, and Y3 are brought to "L" level, respectively.

Each of gate signals X1, Y2, X3, Y1, X2, and Y3 is a pulse signal train and a PWM signal. The phase of gate signals X1, Y1, the phase of gate signals X2, Y2, and the phase of gate signals X3, Y3 are basically shifted from each other by 120 degrees. Gate signals X1, Y1, X2, Y2, X3, and Y3 are generated by control device 5.

For example, when IGBTs Q11 and Q15 turn on, DC positive bus Lp is connected to output node 3a through IGBT Q11, output node 3b is connected to DC negative bus Ln through IGBT Q15, and a positive voltage is output between output nodes 3a and 3b.

When IGBTs Q12 and Q14 turn on, DC positive bus Lp is connected to output node 3b through IGBT Q12, output node 3a is connected to DC negative bus Ln through IGBT Q14, and a negative voltage is output between output nodes 3a and 3b.

Each of IGBTs Q11 to Q16 is turned on and off at a predetermined timing by gate signals X1, Y1, X2, Y2, X3, and Y3, and the ON time of each of IGBTs Q11 to Q16 is adjusted, whereby DC voltage VDC between buses Lp and Ln can be converted to three-phase AC voltages Va, Vb, and Vc.

Figure 3:
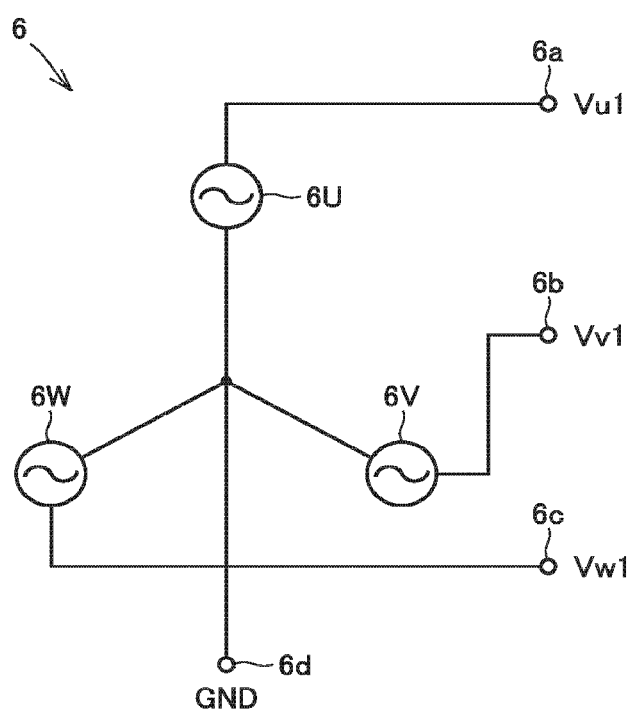
FIG. 3 is an equivalent circuit diagram showing a configuration of a commercial AC power supply shown in FIG. 1.

FIG. 3 is an equivalent circuit diagram showing a configuration of commercial AC power supply 6. In FIG. 3, commercial AC power supply 6 includes three-phase AC power supplies 6U, 6V, and 6W star-connected (Y-connected) to neutral point terminal 6d. AC power supply 6U is connected between AC output terminal 6a and neutral point terminal 6d and outputs AC voltage Vu1 to AC output terminal 6a. AC power supply 6V is connected between AC output terminal 6b and neutral point terminal 6d and outputs AC voltage Vv1 to AC output terminal 6b. AC power supply 6W is connected between AC output terminal 6c and neutral point terminal 6d and outputs AC voltage Vw1 to AC output terminal 6c.

Each of AC voltages Vu1, Vv1, and Vw1 changes sinusoidally at a commercial frequency (for example, 60 Hz). The peak values ($\sqrt{2}$ times the effective value) of AC voltages Vu1, Vv1, and Vw1 are the same, and the phases thereof are shifted from each other by 120 degrees. AC power supplies 6U, 6V, and 6W correspond to, for example, three-phase windings at the last stage included in a three-phase transformer at the last stage of commercial AC power supply 6.

Figure 4:
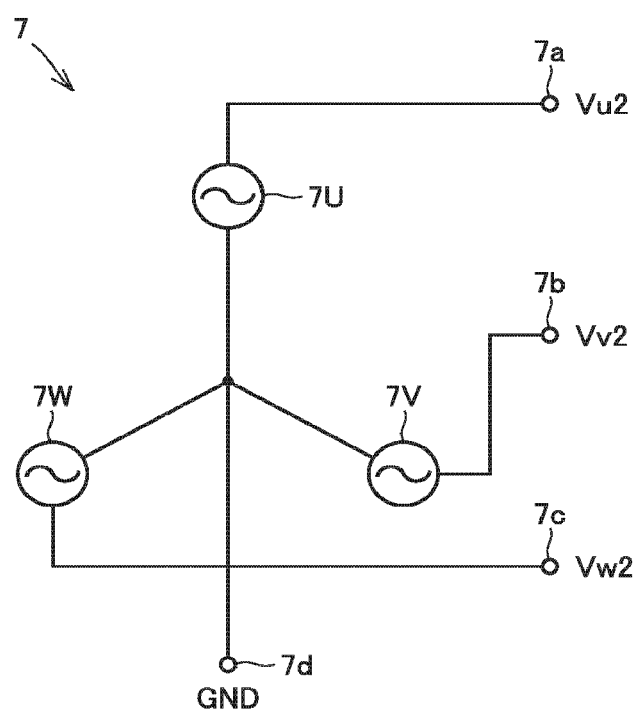
FIG. 4 is an equivalent circuit diagram showing a configuration of a bypass AC power supply shown in FIG. 1.
Figure 5:
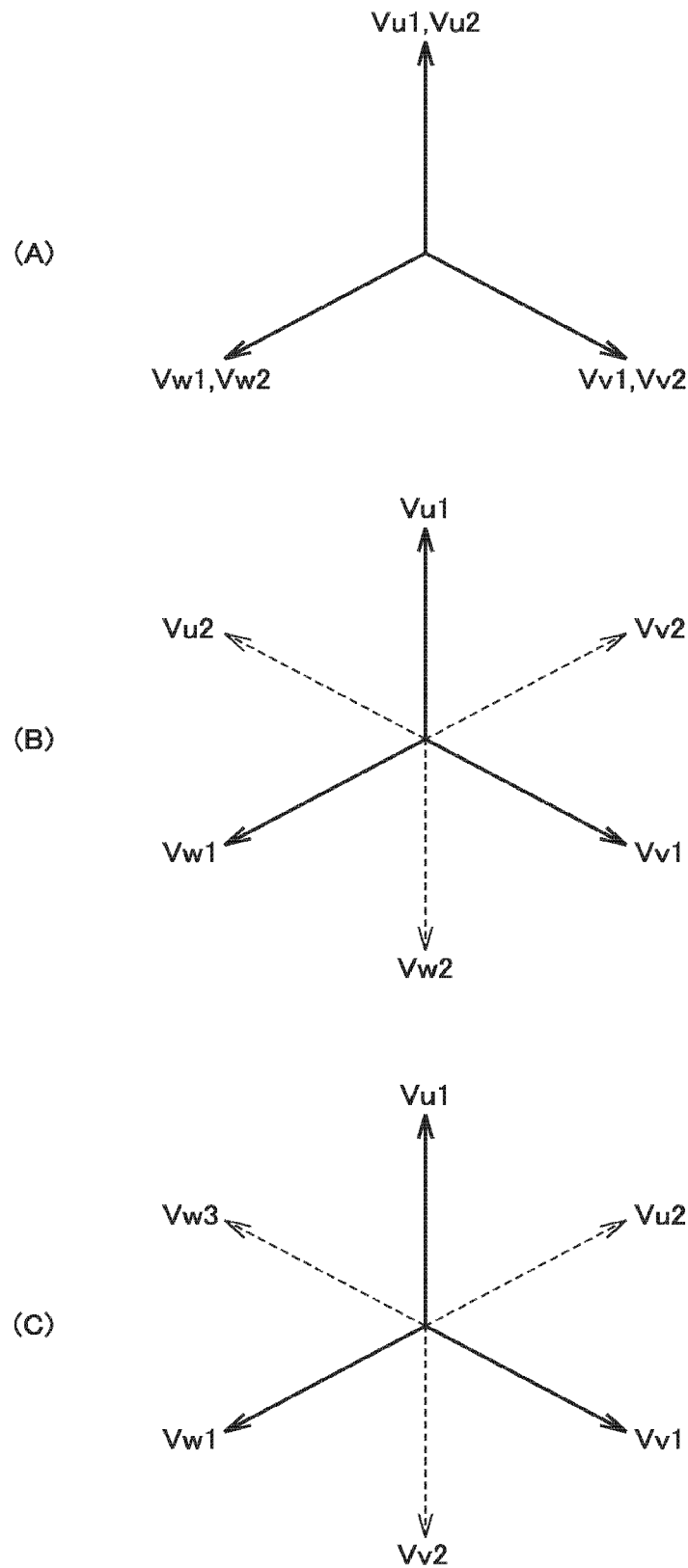
FIG. 5 is a diagram showing the relation between three-phase AC voltage of the commercial AC power supply shown in FIG. 3 and three-phase AC voltage of the bypass AC power supply shown in FIG. 4.

FIG. 4 is an equivalent circuit diagram showing a configuration of bypass AC power supply 7. In FIG. 4, bypass AC power supply 7 includes three-phase AC power supplies 7U, 7V, and 7W star-connected to neutral point terminal 7d. AC power supply 7U is connected between AC output terminal 7a and neutral point terminal 7d and outputs AC voltage Vu2 to AC output terminal 7a. AC power supply 7V is connected between AC output terminal 7b and neutral point terminal 7d and outputs AC voltage Vv2 to AC output terminal 7b. AC power supply 7W is connected between AC output terminal 7c and neutral point terminal 7d and outputs AC voltage Vw2 to AC output terminal 7c.

Each of AC voltages Vu2, Vv2, and Vw2 changes sinusoidally at a commercial frequency. The peak values of AC voltages Vu2, Vv2, Vw2 are the same, and the phases thereof are shifted from each other by 120 degrees. AC power supplies 7U, 7V, and 7W correspond to, for example, a three-phase coil of an independent power generator.

In the inverter power feed mode and the bypass power feed mode, the phases (and peak values) of AC voltages Vu2, Vv2, and Vw2 of bypass AC power supply 7 match the phases (and peak values) of AC voltages Vu1, Vv1, and Vw1 of commercial AC power supply 6, respectively. In this state, no circulating current flows through the uninterruptible power supply apparatus.

However, in the lap power feed mode, when switches S1 to S3 or switches S4 to S6 are turned on, load current of bypass AC power supply 7 significantly fluctuates, and the phases and peak values of AC voltages Vu2, Vv2, Vw2 fluctuate. AC voltages Vu2, Vv2, and Vw2 then do not match AC voltages Vu1, Vv1, and Vw1, respectively.

FIGS. 5(A) to 5(C) are diagrams showing the relation between AC voltages Vu1, Vv1, and Vw1 of commercial AC power supply 6 and AC voltages Vu2, Vv2, and Vw2 of bypass AC power supply 7. Each of AC voltages Vu1, Vv1, Vw1, Vu2, Vv2, and Vw2 is illustrated by a vector. AC voltages Vu1, Vv1, and Vw1 are out of phase by 120 degrees, and AC voltages Vu2, Vv2, and Vw2 are out of phase by 120 degrees. FIG. 5(A) shows a case where the phases of AC voltages Vu2, Vv2, and Vw2 match the phases of AC voltages Vu1, Vv1, and Vw1, respectively.

FIG. 5(B) shows a case where the phases of AC voltages Vu2, Vv2, and Vw2 lag behind the phases of AC voltages Vu1, Vv1, and Vw1, respectively, by 60 degrees. For example, AC voltage Vu1 and AC voltage Vw2 are out of phase by 180 degrees. When AC voltage Vu1 is a positive peak value and AC voltage Vw2 is a negative peak value, voltage $\Delta V12=Vu1-Vw2$ that is the difference between AC voltage Vu1 and AC voltage Vw2 is the sum of peak values of AC voltages Vu1 and Vw2. Conversely, when AC voltage Vu1 is a negative peak value and AC voltage Vw2 is a positive peak value, voltage $\Delta V21=Vw2-Vu1$ that is the difference between AC voltage Vw2 and AC voltage Vu1 is the sum of peak values of AC voltages Vu1 and Vw2.

FIG. 5(C) shows a case where the phases of AC voltages Vu2, Vv2, and Vw2 are ahead of the phases of AC voltages Vu1, Vv1, and Vv1, respectively, by 60 degrees. For example, AC voltage Vu1 and AC voltage Vv2 are out of phase by 180 degrees. When AC voltage Vu1 is a positive peak value and AC voltage Vv2 is a negative peak value, voltage $\Delta V12=Vu1-Vv2$ that is the difference between AC voltage Vu1 and AC voltage Vv2 is the sum of peak values of AC voltages Vu1 and Vv2. Conversely, when AC voltage Vu1 is a negative peak value and AC voltage Vv2 is a positive peak value, voltage $\Delta V21=Vv2-Vu1$ that is the difference between AC voltage Vv2 and AC voltage Vu1 is the sum of peak values of AC voltages Vu1 and Vv2.

If in the lap power feed mode, terminal-to-terminal voltage VDC of capacitor Cd is smaller than the sum of peak values of AC voltages Vu1, Vv1, Vw1 and peak values of AC voltages Vu2, Vv2, Vw2, the following problem arises. For example, as shown in FIG. 5(B), when AC voltages Vu1 and Vw2 are out of phase by 180 degrees and voltage $\Delta V12=Vu1-Vw2$ that is the difference between AC voltages Vu1 and Vw2 is the sum of peak values of AC voltages Vu1 and Vw2, circulating current IC flows through the path shown in FIG. 6.

Figure 6:
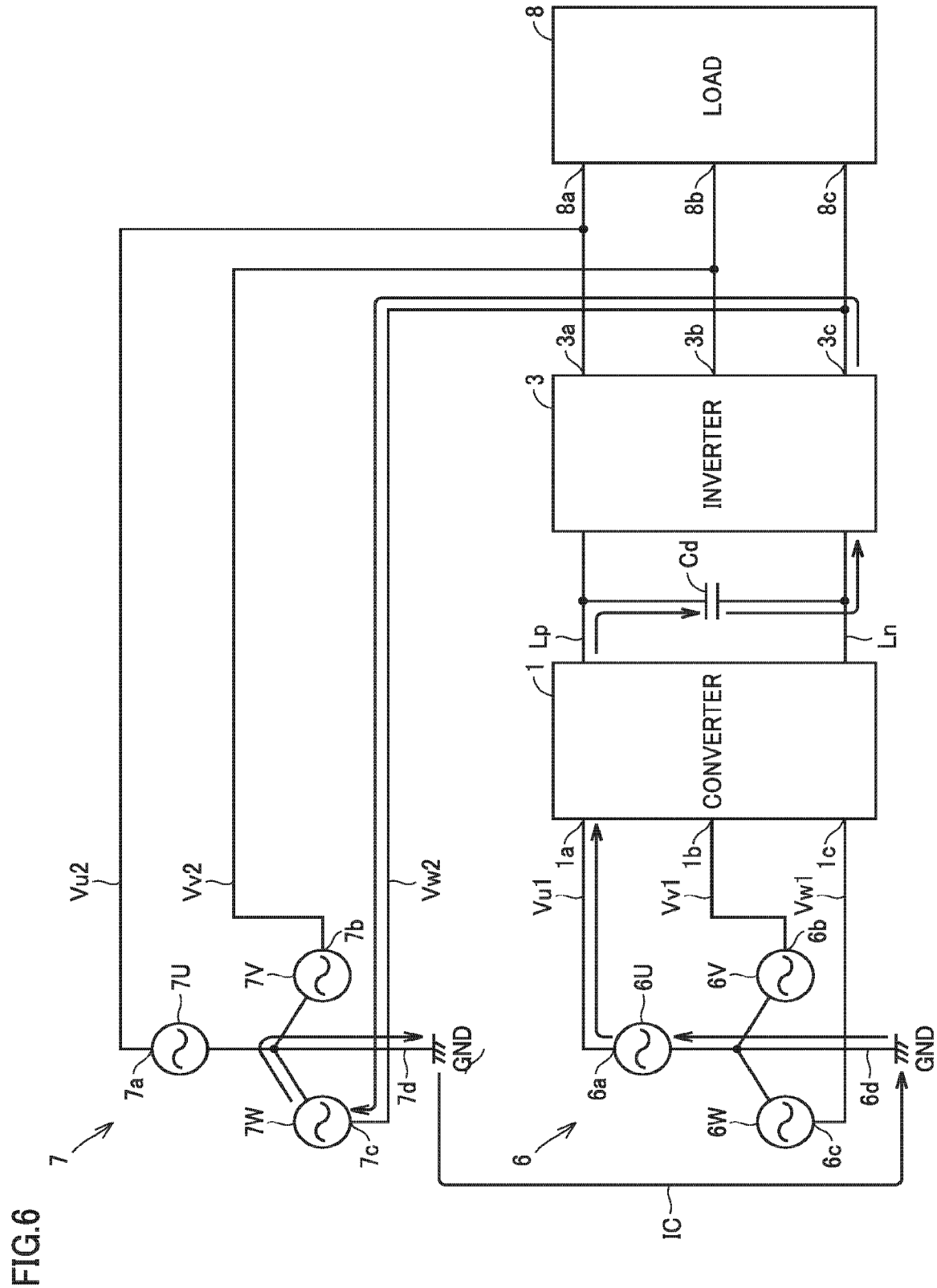
FIG. 6 is a circuit block diagram for explaining circulating current that flows in a lap power feed mode.

That is, circulating current IC flows through a path from one terminal (AC output terminal 6a) of AC power supply 6U to the other terminal of AC power supply 6U through input node 1a of converter 1, diode D1 (FIG. 2), DC positive bus Lp, capacitor Cd, DC negative bus Ln, diode D16 (FIG. 2), output node 3c of inverter 3, AC power supply 7W, neutral point terminal 7d, the line of ground voltage GND, and neutral point terminal 6d. In FIG. 6, for the sake of simplicity of the drawing and the description, filters F1, F2, switches S1 to S6 turned on, and the like are not illustrated.

Figure 7:
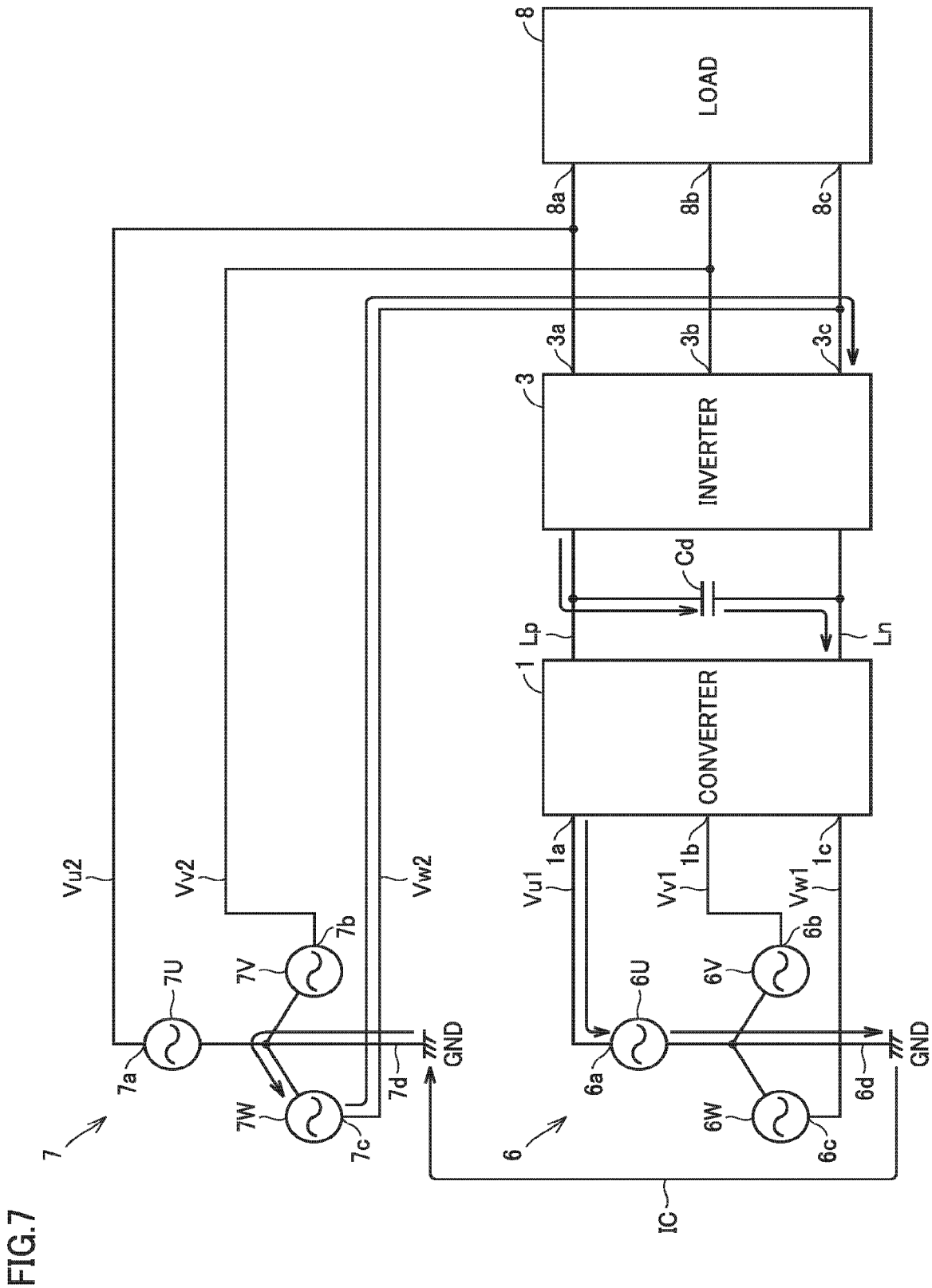
FIG. 7 is another circuit block diagram for explaining the circulating current that flows in the lap power feed mode.

Conversely, when voltage $\Delta V21=Vw2-Vu1$ that is the difference between AC voltages Vw2 and Vu1 is the sum of peak values of AC voltages Vu1 and Vw2, circulating current IC flows through the path shown in FIG. 7. That is, circulating current IC flows through a path from one terminal (AC output terminal 7c) of AC power supply 7W to the other terminal of AC power supply 7W through output node 3c of inverter 3, diode D13 (FIG. 2), DC positive bus Lp, capacitor Cd, DC negative bus Ln, diode D4 (FIG. 2), input node 1a of converter 1, AC power supply 6U, neutral point terminal 6d, the line of ground voltage GND, and neutral point terminal 7d.

When circulating current IC flows, circulating current IC charges capacitor Cd, terminal-to-terminal voltage VDC of capacitor Cd may exceed upper limit voltage VDCH, and control device 5 may determine that abnormality has occurred, so that the operation of the uninterruptible power supply apparatus may be stopped and the operation of load 8 may be stopped. The detected values of current detectors CT1 to CT6 may exceed upper limit current IH, and control device 5 may determine that abnormality has occurred, so that the operation of the uninterruptible power supply apparatus may be stopped and the operation of load 8 may be stopped.

Therefore, in the first embodiment, in the lap power feed mode, terminal-to-terminal voltage VDC of capacitor Cd is set to reference voltage VDCr2 equal to or higher than a voltage of the sum of the peak values of AC voltages Vu1, Vv1, Vw1 and the peak values of AC voltages Vu2, Vv2, Vw2, to prevent circulating current IC from flowing through the uninterruptible power supply apparatus.

In the first embodiment, in the inverter power feed mode and the bypass power feed mode, terminal-to-terminal voltage VDC of capacitor Cd is set to reference voltage VDCr1 lower than the voltage of the sum of the peak values of AC voltages Vu1, Vv1, Vw1 and the peak values of AC voltages Vu2, Vv2, Vw2, to reduce power consumption and improve efficiency.

When bypass AC power supply 7 is stable, AC output voltages Vu2, Vv2, and Vw2 of bypass AC power supply 7 match AC output voltages Vu1, Vv1, and Vw1 of commercial AC power supply 6, and therefore the voltage of the sum of the peak values of AC voltages Vu1, Vv1, Vw1 and the peak values of AC voltages Vu2, Vv2, Vw2 is equal to the voltage twice the peak values of AC voltages Vu1, Vv1, Vw1. The peak values of AC voltages Vu1, Vv1, Vw1 are the same value.

For example, the effective value of AC voltage Vu1 is 277 V and the peak value thereof is 392 V. The voltage twice the peak value of AC voltage Vu1 is 784 V. Reference voltage VDCr1 is set to 750 V lower than 784 V. Reference voltage VDCr2 is set to 920 V higher than 784 V. Reference voltage VDCr2 is set to a value lower than upper limit value VDCH (for example, 1000 V) of terminal-to-terminal voltage VDC of capacitor Cd.

As a result, in the lap power feed mode, for example, even when AC voltage Vu1 becomes a positive peak value (+392 V) and AC voltage Vw2 becomes a negative peak value (−392 V), diodes D1 and D16 (FIG. 2) do not turn on and circulating current IC does not flow, because terminal-to-terminal voltage VDC=VDCr2 (920 V) of capacitor Cd is higher than the sum voltage (784 V) of the peak values of AC voltages Vu1 and Vw2.

Conversely, even when AC voltage Vu1 becomes a negative peak value (−392 V) and AC voltage Vw2 becomes a positive peak value (+392 V), diodes D13 and D4 (FIG. 2) do not turn on and circulating current IC does not flow, because terminal-to-terminal voltage VDC=VDCr2 (920 V) of capacitor Cd is higher than the sum voltage (784 V) of the peak values of AC voltages Vu1 and Vw2. As circulating current IC does not flow, overcurrent or overvoltage of capacitor Cd is not detected, the operation of the uninterruptible power supply apparatus is not stopped, and the operation of load 8 is not stopped.

A method of controlling terminal-to-terminal voltage VDC of capacitor Cd in each power feed mode will now be described. FIGS. 8(A) to 8(C) are circuit block diagrams showing the bypass power feed mode, the lap power feed mode, and the inverter power feed mode, respectively. For the sake of simplicity of the drawings and the description, only a portion related to one of the three phases is illustrated, and only switches S1 and S4 of switches S1 to S6 are illustrated. AC filters F1, F2, current detectors CT1 to CT6, and the like are not illustrated.

In the bypass power feed mode, as shown in FIG. 8(A), switch S4 is turned on and switch S1 is turned off, and load current I4 is supplied from bypass AC power supply 7 to load 8 through switch S4. Converter 1 is controlled such that terminal-to-terminal voltage VDC of capacitor Cd becomes reference voltage VDCr1, and current I1=IFB1+IFF1=IFB1+K1×I4, which includes a first feedback component IFB1 having a value corresponding to deviation ΔVDC=VDCr1−VDC between reference voltage VDCr1 and terminal-to-terminal voltage VDC of capacitor Cd, and a first feed forward component IFF1=K1×I4 obtained by multiplying load current I4 by gain K1, is passed from commercial AC power supply 6 to converter 1.

In this case, by the passing of first feed forward component IFF1 to converter 1, terminal-to-terminal voltage VDC of the capacitor can be stably controlled by setting the response speed of first feedback component IFB1 to low speed, and terminal-to-terminal voltage VDC of the capacitor can be controlled at high speed in response to fluctuation in load current I4. Once terminal-to-terminal voltage VDC of capacitor Cd is charged to reference voltage VDCr1, first feedback component IFB1 and first feed forward component IFF1 cancel each other out, causing input current I1 to converter 1 to be nearly 0 A.

In the switching period of switching from the bypass power feed mode to the inverter power feed mode, the lap power feed mode is executed. In the lap power feed mode, as shown in FIG. 8(B), both of switches S1 and S4 are turned on. When switch S1 is turned on, a load on bypass AC power supply 7 (for example, a power generator) changes suddenly and a frequency of output voltage from bypass AC power supply 7 fluctuates, output voltage from bypass AC power supply 7 and output voltage from inverter 3 become out of phase from each other, and current I4 is supplied from both of inverter 3 and bypass AC power supply 7 to load 8 at a ratio corresponding to a phase difference between them. FIG. 8(B) shows a case where 60% of load current I4 is supplied from inverter 3, and 40% of load current I4 is supplied form bypass AC power supply 7.

When current flows from inverter 3 to load 8, terminal-to-terminal voltage VDC of capacitor Cd decreases, and input current I1 to converter 1 increases. In this case, if current I1=IFB1+K1×I4 is passed from commercial AC power supply 6 to converter 1 as in the bypass power feed mode, input current I1 to converter 1 becomes greater than output current 0.6×I4 from inverter 3, which cannot be followed by feedback control, and terminal-to-terminal voltage VDC of capacitor Cd may become higher than reference voltage VDCr2 and exceed upper limit voltage VDCH.

Therefore, in the first embodiment, to prevent the increase in terminal-to-terminal voltage VDC of capacitor Cd, the feed forward component of input current I1 to converter 1 is reduced in the lap power feed mode. That is, converter 1 is controlled such that terminal-to-terminal voltage VDC of capacitor Cd becomes reference voltage VDCr2, and current I1=IFB2+IFF2=IFB2+K2×I4, which includes a second feedback component IFB2 having a value corresponding to deviation ΔVDC=VDCr2−VDC between reference voltage VDCr2 and terminal-to-terminal voltage VDC of capacitor Cd, and a second feed forward component IFF2 obtained by multiplying load current I4 by gain K2 (0.7) smaller than gain K1 (for example, 1.0), is passed from commercial AC power supply 6 to converter 1.

As a result, input current I1 to converter 1 can be prevented from becoming greater than output current 0.6×I4 from inverter 3, and output voltage VDC from converter 1 (that is, terminal-to-terminal voltage VDC of capacitor Cd) can be prevented from exceeding upper limit voltage VDCH higher than reference voltage VDCr2.

In the inverter power feed mode, as shown in FIG. 8(C), switch S1 is turned on and switch S4 is turned off, and load current I4 is supplied from inverter 3 to load 8 through switch S1. Converter 1 is controlled such that terminal-to-terminal voltage VDC of capacitor Cd becomes reference voltage VDCr1, and current I1=IFB1+IFF1=IFB1+K1×I4, which includes first feedback component IFB1 having the value corresponding to deviation ΔVDC=VDCr1−VDC between reference voltage VDCr1 and terminal-to-terminal voltage VDC of capacitor Cd, and first feed forward component IFF1=K1×I4 obtained by multiplying load current I4 by gain K1, is passed from commercial AC power supply 6 to converter 1.

In this case, by the passing of first feed forward component IFF1 to converter 1, terminal-to-terminal voltage VDC of the capacitor can be stably controlled by setting the response speed of first feedback component IFB1 to low speed, and terminal-to-terminal voltage VDC of the capacitor can be controlled at high speed in response to fluctuation in load current I4.

Similar control is performed when the inverter power feed mode is switched to the bypass power feed mode through the lap power feed mode. However, if terminal-to-terminal voltage VDC of capacitor Cd increases when the lap power feed mode is switched to the bypass power feed mode, the operation of converter 1 is stopped. Even after the operation of converter 1 is stopped, current I4 is supplied from bypass AC power supply 7 to load 8 through switch S4 to continue the operation of load 8.

Figure 9:
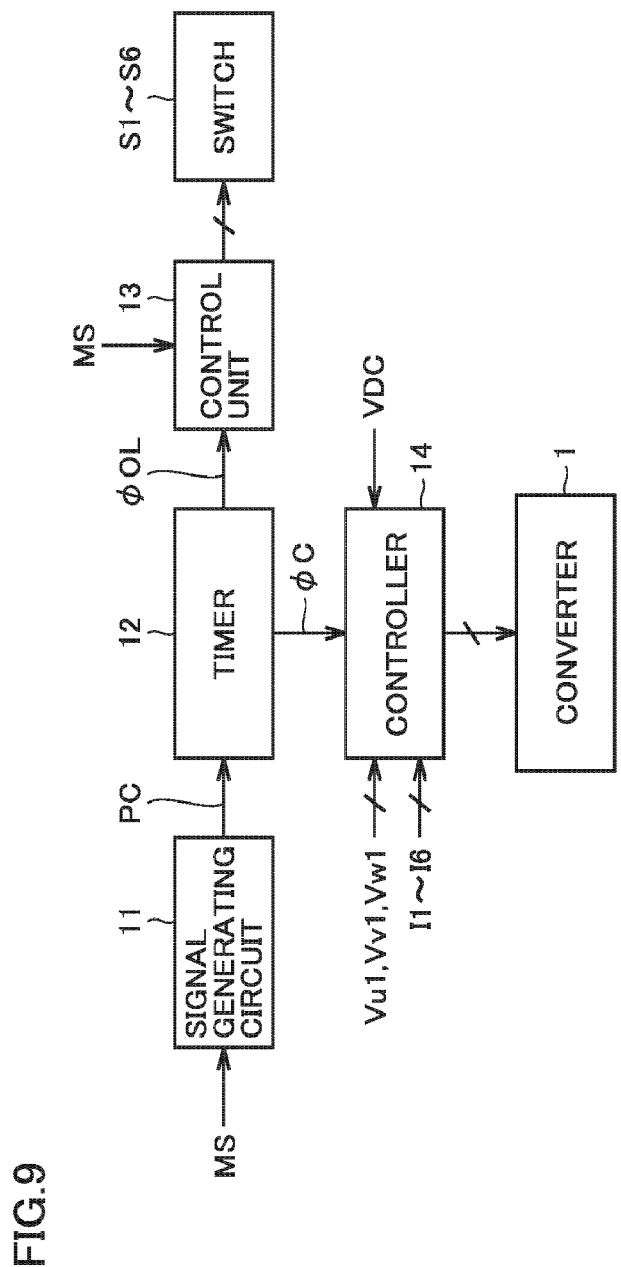
FIG. 9 is a block diagram showing the main part of a control device shown in FIG. 1.

A method of controlling converter 1 and switches S1 to S6 will now be described. FIG. 9 is a block diagram showing a configuration of a part of control device 5 that is related to control of converter 1 and switches S1 to S6. In FIG. 9, control device 5 includes a signal generating circuit 11, a timer 12, and controllers 13, 14.

Operation unit 4 (FIG. 1) brings mode select signal MS to "L" level when the user of the uninterruptible power supply apparatus selects the inverter power feed mode, and brings mode select signal MS to "H" level when the user selects the bypass power feed mode. Signal generating circuit 11 raises switch command signal PC to "H" level for a predetermined period of time, in response to each of the rising edge and the falling edge of mode select signal MS from operation unit 4.

Timer 12 successively measures first time T1, second time T2, and third time T3, in response to the rising edge of switch command signal PC. Timer 12 brings switch signal ϕC to "H" level that is the active level from the rising edge of switch command signal PC to third time T3. Further, timer 12 brings overlap command signal ϕOL to "H" level that is the active level from first time T1 to second time T2.

Controller 13 controls switches S1 to S6 in accordance with mode select signal MS and overlap command signal ϕOL. When both of mode select signal MS and overlap command signal ϕOL are "L" level, controller 13 turns on switches S1 to S3 and turns off switches S4 to S6. Controller 13 corresponds to an embodiment of "first controller."

When overlap command signal ϕOL is "H" level, controller 13 turns on all of switches S1 to S6. When mode select signal MS is "H" level and overlap command signal ϕOL is "L" level, controller 13 turns on switches S4 to S6 and turns off switches S1 to S3.

Controller 14 operates based on AC input voltages Vu1, Vv1, Vw1, three-phase input currents I1 to I3, load currents I4 to I6, and DC voltage VDC, and controls converter 1 such that terminal-to-terminal voltage VDC of capacitor Cd matches reference voltage VDCr. Controller 14 corresponds to an embodiment of "second controller."

Figure 10:
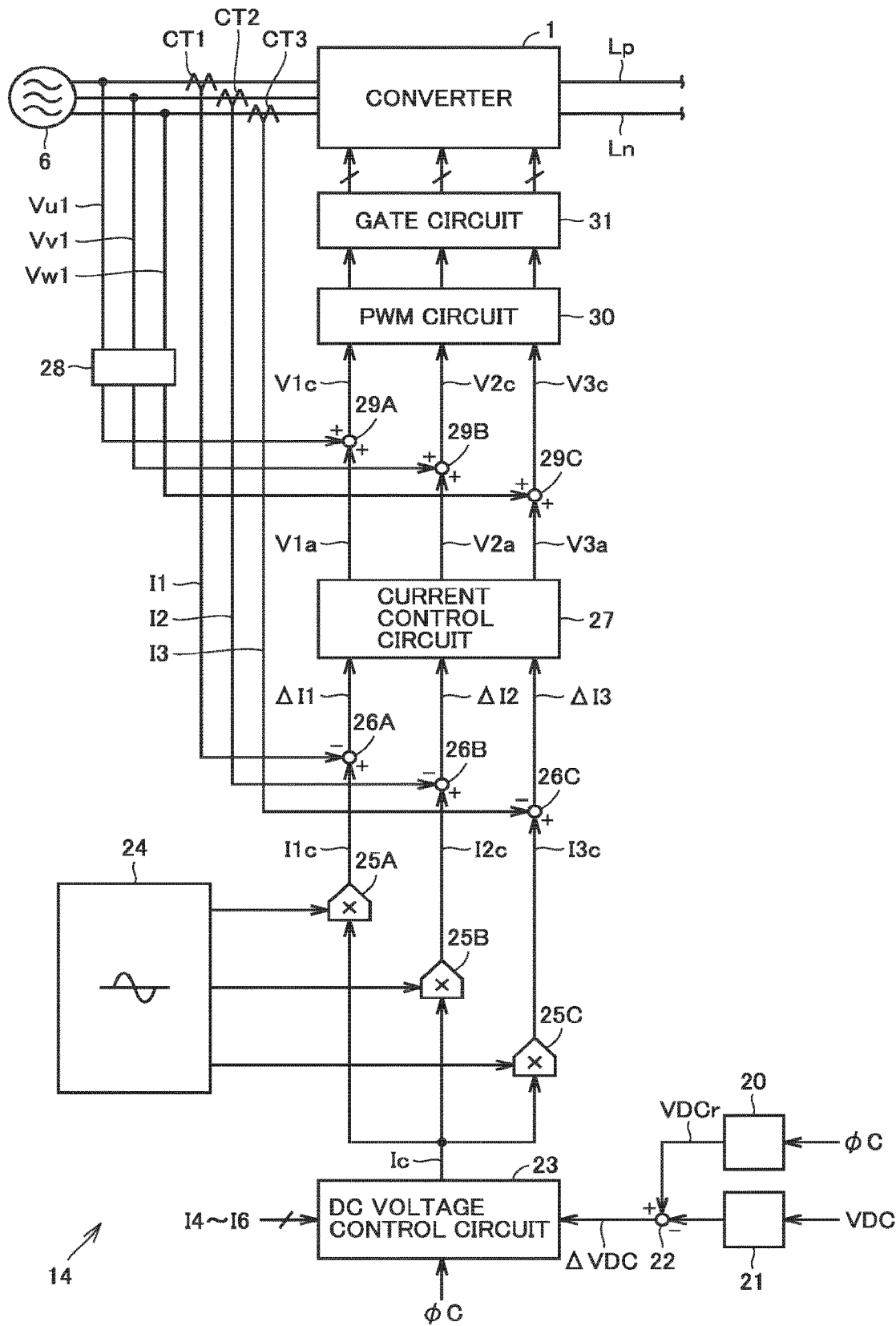
FIG. 10 is a circuit block diagram showing a configuration of a controller 14 shown in FIG. 9.

FIG. 10 is a circuit block diagram showing a configuration of controller 14. In FIG. 10, controller 14 includes a reference voltage generating circuit 20, voltage detectors 21 and 28, subtracters 22 and 26A to 26C, a DC voltage control circuit 23, a sine wave generating circuit 24, multipliers 25A to 25C, a current control circuit 27, adders 29A to 29C, a PWM circuit 30, and a gate circuit 31.

Reference voltage generating circuit 20 outputs reference voltage VDCr based on switch signal ϕC from timer 12. When switch signal ϕC is "L" level that is the inactive level, reference voltage VDCr is set to reference voltage VDCr1. When switch signal ϕC is "H" level that is the active level, reference voltage VDCr is set to reference voltage VDCr2.

Voltage detector 21 detects terminal-to-terminal voltage VDC of capacitor Cd and outputs a signal indicating the detected value. Subtracter 22 subtracts terminal-to-terminal voltage VDC of capacitor Cd indicated by the output signal from voltage detector 21 from reference voltage VDCr generated by reference voltage generating circuit 20, to obtain deviation ΔVDC=VDCr−VDC between reference voltage VDCr and DC voltage VDC.

Figure 11:
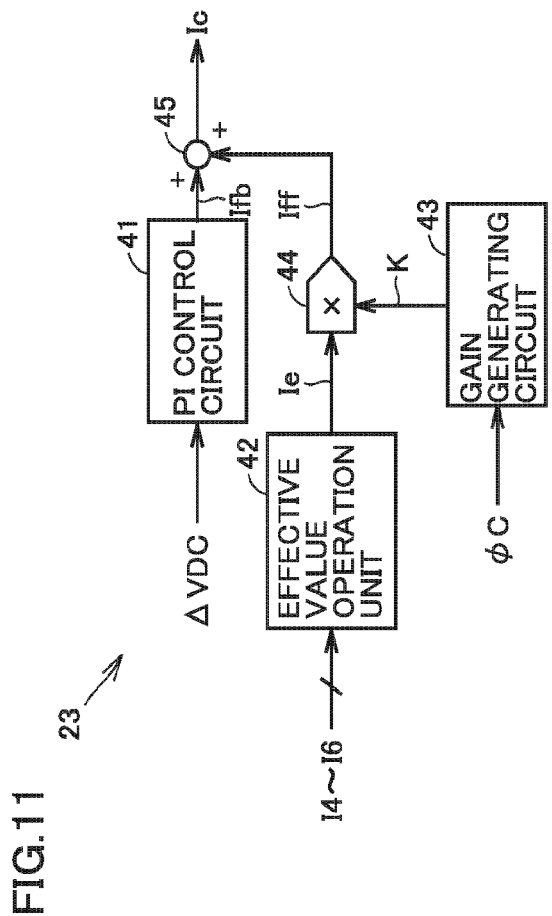
FIG. 11 is a circuit block diagram showing a configuration of a DC voltage control circuit shown in FIG. 10.

DC voltage control circuit 23 generates current command value Ic for controlling input currents I1 to I3 of converter 1 based on deviation ΔVDC, load currents I4 to I6, and switch signal ϕC. FIG. 11 is a circuit block diagram showing a configuration of DC voltage control circuit 23. In FIG. 11, DC voltage control circuit 23 includes a PI (Proportional-Integral) control circuit 41, an effective value operation unit 42, a gain generating circuit 43, a multiplier 44, and an adder 45.

PI control circuit 41 obtains feedback component Ifb having the value corresponding to deviation ΔVDC=VDCr−VDC by performing proportional integral operation of deviation ΔVDC. Feedback component Ifb is expressed in the following equation (1):

$$I_{fb}=K_P \times \Delta VDC + K_I \int_0^T \Delta VCDdt$$

Feedback control is performed such that feedback component Ifb increases and deviation ΔVDC decreases when deviation ΔVDC increases, and feedback component Ifb decreases and deviation ΔVDC is eliminated when deviation ΔVDC decreases.

Effective value operation unit 42 obtains an effective value Ie of load currents I4 to I6 indicated by output signals from current detectors CT4 to CT6, and outputs a signal indicating that effective value Ie. Gain generating circuit 43 outputs gain K in accordance with switch signal ϕC. When switch signal ϕC is "L" level, gain K is set to gain K1. When switch signal ϕC is "H" level, gain K is set to gain K2 smaller than gain K1.

Multiplier 44 multiples effective value Ie of load currents I4 to I6 by gain K to generate feed forward component Iff=K×Ie of current command value Ic. Adder 45 adds feedback component Ifb to feed forward component Iff to generate current command value Ic=Ifb+Iff.

In the first embodiment, since feed forward component Iff is introduced into current command value Ic, a proportional gain Kp of feedback component Ifb can be set to a relatively small value, to stabilize the PI control.

Referring back to FIG. 10, sine wave generating circuit 24 generates a three-phase sine wave signal having the same phase as three-phase AC voltages Vu1, Vv1, and Vw1 from commercial AC power supply 6. Multipliers 25A to 25C multiply the three-phase sine wave signals by current command value Ic to generate three-phase current command values I1c to I3c, respectively.

Subtracter 26A calculates deviation ΔI1=I1c−I1 between current command value I1c and AC current I1 detected by current detector CT1. Subtracter 26B calculates deviation ΔI2=I2c−I2 between current command value I2c and AC current I2 detected by current detector CT2. Subtracter 26C calculates deviation ΔI3=I3c−I3 between current command value I3c and AC current I3 detected by current detector CT3.

Current control circuit 27 generates voltage command values V1a, V2a, and V3a such that each of deviations ΔI1, ΔI2, and ΔI3 becomes zero. Current control circuit 27 generates voltage command values V1a, V2a, and V3a, for example, by performing proportional control or proportional integral control of deviations ΔI1, ΔI2, and ΔI3. Voltage detector 28 detects instantaneous values of three-phase AC voltages Vu1, Vv1, and Vw1 from commercial AC power supply 6 and outputs signals indicating their detected values.

Adder 29A adds voltage command value V1a to AC voltage Vu1 detected by voltage detector 28 to generate voltage command value V1c. Adder 29B adds voltage command value V2a to AC voltage Vv1 detected by voltage detector 28 to generate voltage command value V2c. Adder 29C adds voltage command value V3a to AC voltage Vw1 detected by voltage detector 28 to generate voltage command value V3c.

PWM circuit 30 generates PWM control signals ϕ1 to ϕ3 for controlling converter 1, based on voltage command values V1c to V3c. Gate circuit 31 generates gate signals A1, B1, A2, B2, A3, and B3 (FIG. 2) based on PWM control signals ϕ1 to ϕ3.

With such control, in the inverter power feed mode and the bypass power feed mode, AC currents I1 to I3, which include the first feedback component having the value corresponding to deviation ΔVDC=VDCr1−VDC between reference voltage VDCr1 and terminal-to-terminal voltage VDC of the capacitor, and the first feed forward component obtained by multiplying load currents I4 to I6 by gain K1, can be passed from commercial AC power supply 6 to converter 1, such that terminal-to-terminal voltage VDC of capacitor Cd becomes reference voltage VDCr1.

In the switching period, AC currents I1 to I3, which include the second feedback component having the value corresponding to deviation ΔVDC=VDCr2−VDC between reference voltage VDCr2 and terminal-to-terminal voltage VDC of capacitor Cd, and the second feed forward component obtained by multiplying load currents I4 to I6 by gain K2 smaller than gain K1, can be passed from commercial AC power supply 6 to converter 1, such that terminal-to-terminal voltage VDC of capacitor Cd becomes reference voltage VDCr2.

Figure 12:
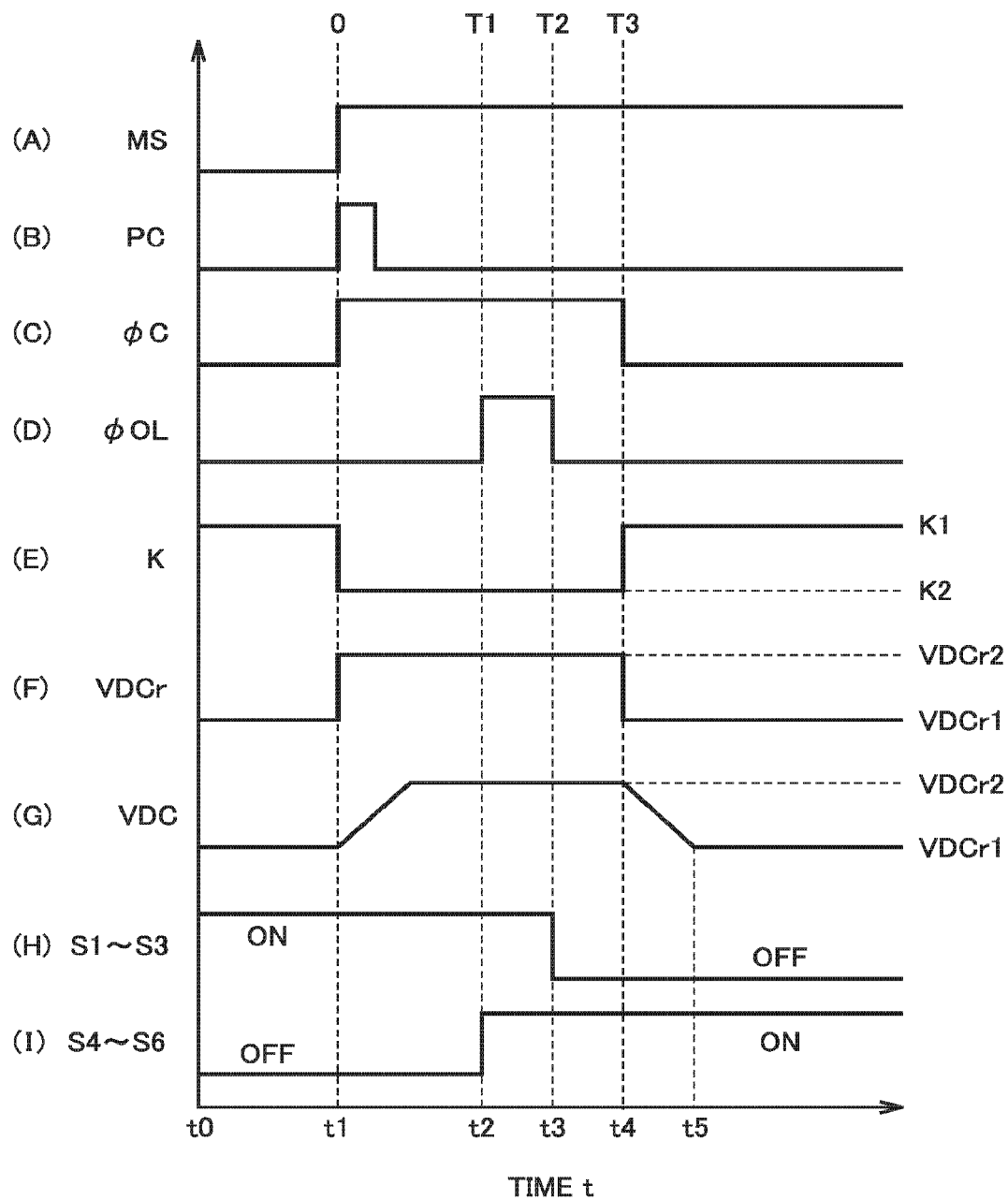
FIG. 12 is a time chart showing the operation of the control device shown in FIG. 9.
Figure 13:
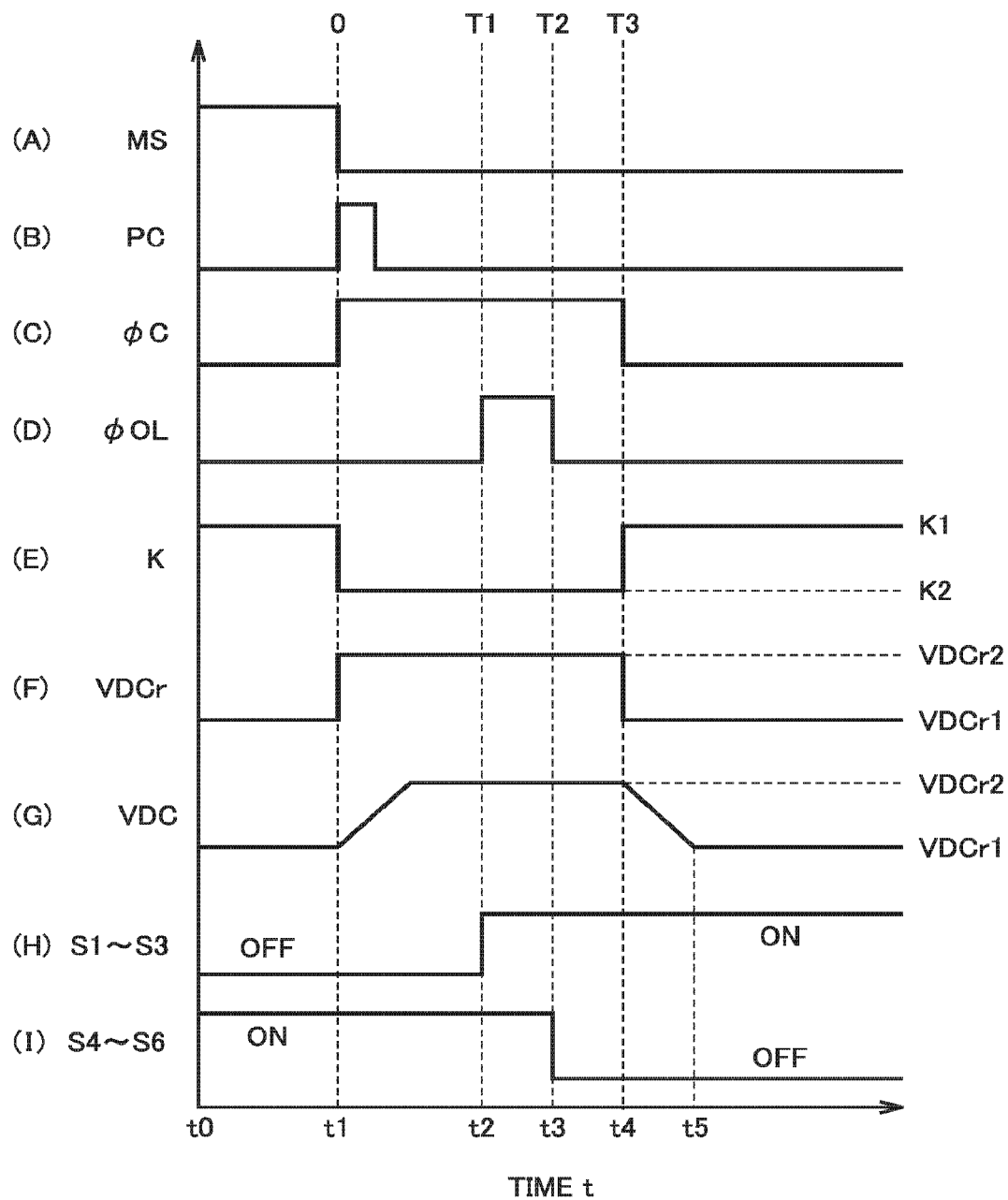
FIG. 13 is another time chart showing the operation of the control device shown in FIG. 9.

FIGS. 12(A) to 12(I) are time charts showing the operation of control device 5 shown in FIG. 9. FIG. 12(A) shows the waveform of mode select signal MS, FIG. 12(B) shows the waveform of switch command signal PC, FIG. 12(C) shows the waveform of switch signal ϕOC, and FIG. 12(D) shows the waveform of overlap command signal ϕOL.

FIG. 12(E) shows gain K, FIG. 12(F) shows reference voltage VDCr, FIG. 12(G) shows terminal-to-terminal voltage VDC of capacitor Cd, FIG. 12(H) shows the state of switches S1 to S3, and FIG. 12(I) shows the state of switches S4 to S6. FIGS. 12(A) to 12(I) show the operation in a case where the inverter power feed mode is switched to the bypass power feed mode.

At time t0, the inverter power feed mode is executed, and all of mode select signal MS, switch command signal PC, switch signal ϕC, and overlap command signal ϕOL are brought to "L" level. Gain K is brought to gain K1, reference voltage VDCr is brought to reference voltage VDCr1, terminal-to-terminal voltage VDC of capacitor Cd is brought to reference voltage VDCr1, switches S1 to S3 are turned on, and switches S4 to S6 are turned off.

When the bypass power feed mode is selected using operation unit 4 at a certain time t1, mode select signal MS is raised from "L" level to "H" level, and switch command signal PC is raised to "H" level by signal generating circuit I1 for a predetermined period of time. In response to the rising edge of switch command signal PC, timer 12 successively measures first time T1, second time T2, and third time T3 and generates switch signal ϕC and overlap command signal ϕOL based on the time measurement result.

Switch signal ϕC is brought to "H" level from the rising edge of switch command signal PC (time t1) to third time T3 (time t4). Overlap command signal ϕOL is brought to "H" level from first time T1 (time t2) to second time T2 (time t3).

When switch signal ϕC is raised from "L" level to "H" level (time t1), gain K is lowered from gain K1 to gain K2, reference voltage VDCr is raised from reference voltage VDCr1 to reference voltage VDCr2, and converter 1 is controlled by controller 14 such that terminal-to-terminal voltage VDC of capacitor Cd becomes reference voltage VDCr2.

In a period in which terminal-to-terminal voltage VDC of capacitor Cd is reference voltage VDCr2, lap command signal ϕOL is brought to "H" level, and the lap power feed mode is executed. When lap command signal ϕOL is raised to "H" level (time t2), switches S4 to S6 are turned on. At this point of time, since terminal-to-terminal voltage VDC of capacitor Cd is raised to reference voltage VDCr2, circulating current IC (FIGS. 6 and 7) does not flow. In addition, since gain K is lowered to gain K2, the increase in terminal-to-terminal voltage VDC of capacitor Cd is prevented. When lap command signal ϕOL is lowered to "L" level (time t3), switches S1 to S3 are turned off, and the lap power feed mode ends.

When switch signal ϕC is lowered to "L" level (time t4), gain K is raised from gain K2 to gain K1, reference voltage VDCr is lowered to reference voltage VDCr1, and capacitor Cd is discharged. When terminal-to-terminal voltage VDC of capacitor Cd becomes reference voltage VDCr1, the switching from the inverter power feed mode to the bypass power feed mode is completed.

FIGS. 13(A) to 13(I) are other time charts showing the operation of control device 5 shown in FIG. 9, in comparison with FIGS. 12(A) to 12(I). FIG. 13(A) to 13(I) show the operation in a case where the bypass power feed mode is switched to the inverter power feed mode.

At time t0, the bypass power feed mode is executed, mode select signal MS is brought to "H" level, and all of switch command signal PC, switch signal ϕC, and overlap command signal ϕOL are brought to "L" level. Gain K is brought to gain K1, reference voltage VDCr is brought to reference voltage VDCr1, terminal-to-terminal voltage VDC of capacitor Cd is brought to reference voltage VDCr1, switches S1 to S3 are turned off, and switches S4 to S6 are turned on.

When the inverter power feed mode is selected using operation unit 4 at a certain time t1, mode select signal MS is lowered from "H" level to "L" level, and switch command signal PC is raised to "H" level by signal generating circuit I1 for a predetermined period of time. In response to the rising edge of switch command signal PC, timer 12 successively measures first time T1, second time T2, and third time T3 and generates switch signal ϕC and overlap command signal ϕOL based on the time measurement result.

Switch signal ϕC is brought to "H" level from the rising edge of switch command signal PC (time t1) to third time T3 (time t4). Overlap command signal ϕOL is brought to "H" level from first time T1 (time t2) to second time T2 (time t3).

When switch signal ϕC is raised from "L" level to "H" level (time t1), gain K is lowered from gain K1 to gain K2, reference voltage VDCr is raised from reference voltage VDCr1 to reference voltage VDCr2, and converter 1 is controlled by controller 14 such that terminal-to-terminal voltage VDC of capacitor Cd becomes reference voltage VDCr2.

In a period in which terminal-to-terminal voltage VDC of capacitor Cd is reference voltage VDCr2, lap command signal ϕOL is brought to "H" level, and the lap power feed mode is executed. When lap command signal ϕOL is raised to "H" level (time t2), switches S1 to S3 are turned on. At this point of time, since terminal-to-terminal voltage VDC of capacitor Cd is raised to reference voltage VDCr2, circulating current IC (FIGS. 6 and 7) does not flow. In addition, since gain K is lowered to gain K2, the increase in terminal-to-terminal voltage VDC of capacitor Cd is prevented. When lap command signal ϕOL is lowered to "L" level (time t3), switches S4 to S6 are turned off, and the lap power feed mode ends.

When switch signal ϕC is lowered to "L" level (time t4), gain K is raised from gain K2 to gain K1, reference voltage VDCr is lowered to reference voltage VDCr1, and capacitor Cd is discharged. When terminal-to-terminal voltage VDC of capacitor Cd becomes reference voltage VDCr1, the switching from the bypass power feed mode to the inverter power feed mode is completed.

As described above, in the first embodiment, since AC currents I1 to I3 including the feedback component and the feed forward component are passed into converter 1, the control can be stabilized by low-speed control of the feedback component, and a sudden change in load currents I4 to I6 can be addressed by the feed forward component. In the switching period of switching between the inverter power feed mode and the bypass power feed mode, since gain K is reduced to reduce the feed forward component, terminal-toterminal voltage VDC of capacitor Cd can be prevented from exceeding upper limit voltage VDCH in the lap power feed mode.

In addition, in the switching period, converter 1 is controlled such that terminal-to-terminal voltage VDC of capacitor Cd becomes reference voltage VDCr2 higher than reference voltage VDCr1, to prevent circulating current IC from flowing through a path including capacitor Cd and the like. Therefore, even when both of neutral point terminal 6d of commercial AC power supply 6 and neutral point terminal 7d of bypass AC power supply 7 are grounded, flowing of circulating current IC can be prevented.

In the first embodiment, gain K of the feedback component is controlled in response to switch signal φC, and gain K is set to gain K2 smaller than gain K1 in the switching period. However, this is not restrictive, and gain K may be controlled in response to lap command signal φOL, and gain K may be set to gain K2 only in the lap power feed mode.

Second Embodiment

Figure 14:
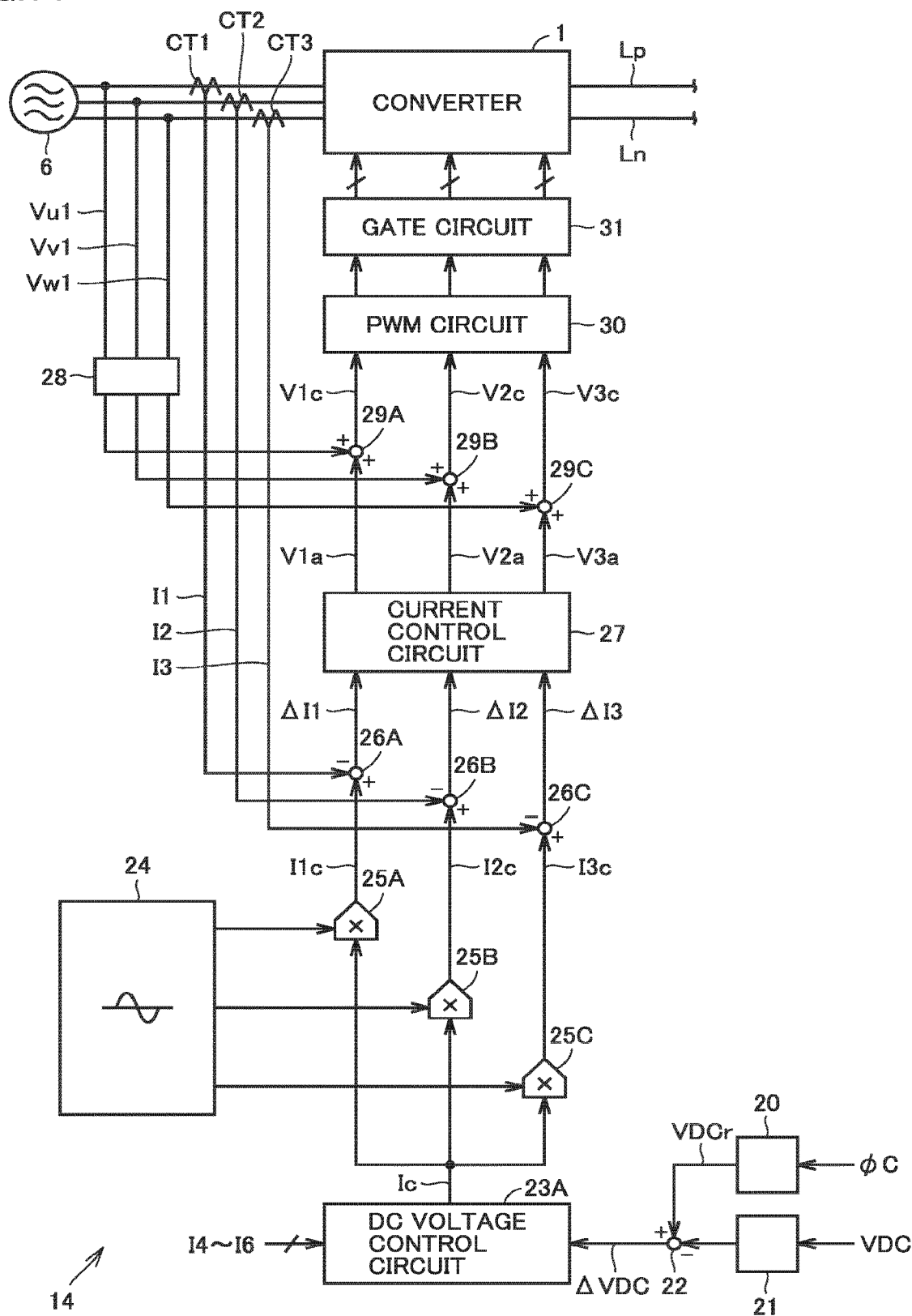
FIG. 14 is a circuit block diagram showing the main part of an uninterruptible power supply apparatus according to a second embodiment of the present invention.

FIG. 14 is a circuit block diagram showing the main part of an uninterruptible power supply apparatus according to a second embodiment of the present invention, in comparison with FIG. 10. Referring to FIG. 14, this uninterruptible power supply apparatus is different from the uninterruptible power supply apparatus in the first embodiment in that DC voltage control circuit 23 is replaced by a DC voltage control circuit 23A.

Figure 15:
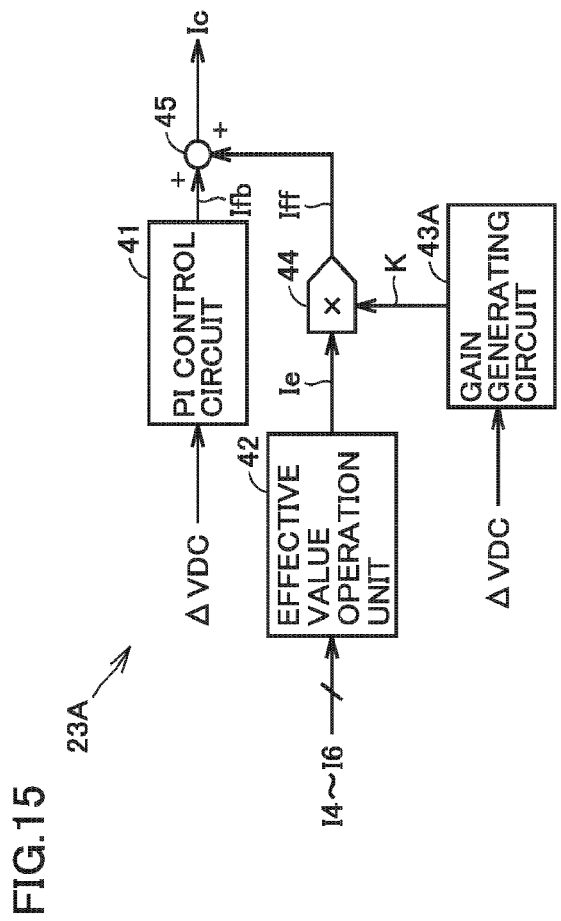
FIG. 15 is a circuit block diagram showing a configuration of a DC voltage control circuit shown in FIG. 14.

In DC voltage control circuit 23A, gain generating circuit 43 of DC voltage control circuit 23 is replaced by a gain generating circuit 43A, as shown in FIG. 15. When deviation ΔVDC=VDCr−VDC between reference voltage VDCr and terminal-to-terminal voltage VDC of capacitor Cd is zero, gain generating circuit 43A sets gain K to gain K1 (first value). When deviation ΔVDC exceeds zero, gain generating circuit 43A sets gain K to a gain Kc (second value) smaller than gain K1 by reducing gain K in accordance with deviation ΔVDC. Since the configuration and operation are otherwise the same as those in the first embodiment, the description thereof will not be repeated.

As described above, in the second embodiment, since gain K is reduced to decrease the feed forward component when terminal-to-terminal voltage VDC of capacitor Cd increases and deviation ΔVDC increases, terminal-to-terminal voltage VDC of capacitor Cd can be prevented from exceeding upper limit voltage VDCH not only in the lap power feed mode but also in the inverter power feed mode and the bypass power feed mode.

It should be understood that the embodiments disclosed herein are illustrative and non-restrictive in every respect. The present invention is defined by the terms of the claims, rather than the description above, and is intended to include any modifications within the scope and meaning equivalent to the terms of the claims.

REFERENCE SIGNS LIST

C1 to C6, Cd capacitor; L1 to L6 reactor; CT1 to CT6 current detector; 1 converter; Lp DC positive bus; Ln DC negative bus; 2 bidirectional chopper; 3 inverter; S1 to S6 switch; 4 operation unit; 5 control device; 6 commercial AC power supply; 6d, 7d neutral point terminal; 6U, 6V, 6W, 7U, 7V, 7W AC power supply; 7 bypass AC power supply; 8 load; Q1 to Q6, Q11 to Q16 IGBT; D1 to D6, D11 to D16 diode; 11 signal generating circuit; 12 timer; 13, 14 controller; 20 reference voltage generating circuit; 21, 28 voltage detector; 22, 26A to 26C subtracter; 23, 23A DC voltage control circuit; 24 sine wave generating circuit; 25A to 25C, 44 multiplier; 27 current control circuit; 29A to 29C, 45 adder; 30 PWM circuit; 31 gate circuit; 41 PI control circuit; 42 effective value operation unit; 43, 43A gain generating circuit.

The invention claimed is:

1. An uninterruptible power supply apparatus comprising:
a rectifier that converts first AC voltage supplied from a first AC power supply to DC voltage;
a capacitor that smooths DC output voltage from the rectifier;
an inverter that converts terminal-to-terminal voltage of the capacitor to second AC voltage;
a first switch having a first terminal receiving the second AC voltage and a second terminal connected to a load;
a second switch having a first terminal receiving third AC voltage supplied from a second AC power supply and a second terminal connected to the load;
a first current detector that detects AC current flowing between the first AC power supply and the rectifier;
a second current detector that detects load current;
a first controller that controls the first and second switches; and
a second controller that controls the rectifier based on results of detection by the first and second current detectors, wherein
the first controller
(i) in a first mode in which the second AC voltage is supplied to the load, turns on the first switch and turns off the second switch,
(ii) in a second mode in which the third AC voltage is supplied to the load, turns on the second switch and turns off the first switch, and
(iii) in a switching period in which one mode of the first and second modes is switched to the other mode, turns on the first and second switches and executes a third mode in which the second and third AC voltages are supplied to the load, and
the second controller
(iv) in the first and second modes, passes first AC current from the first AC power supply to the rectifier such that the terminal-to-terminal voltage of the capacitor becomes a first reference voltage, the first AC current including a first feedback component having a value corresponding to deviation between the first reference voltage and the terminal-to-terminal voltage of the capacitor, and a first feed forward component obtained by multiplying the load current by a first gain, and
(v) in the switching period, passes second AC current from the first AC power supply to the rectifier such that the terminal-to-terminal voltage of the capacitor becomes a second reference voltage, the second AC current including a second feedback component having a value corresponding to deviation between the second reference voltage and the terminal-to-terminal voltage of the capacitor, and a second feed forward component obtained by multiplying the load current by a second gain smaller than the first gain,
to prevent the terminal-to-terminal voltage of the capacitor from exceeding an upper limit voltage higher than the first and second reference voltages.

2. The uninterruptible power supply apparatus according to claim 1, wherein
the second controller is configured to set the second reference voltage to be higher than the first reference voltage, to prevent circulating current from flowing from one AC power supply of the first and second AC power supplies to the other AC power supply through the capacitor.

3. The uninterruptible power supply apparatus according to claim 2, wherein
each of the first and second AC power supplies includes a three-phase AC power supply start-connected to a neutral point,
both of neutral points of the first and second AC power supplies are grounded,
each of the first to third AC voltages includes three-phase AC voltage,
the first switch includes three first terminals receiving the three-phase AC voltage included in the second AC voltage, and three second terminals connected to the load,
the second switch includes three first terminals receiving the three-phase AC voltage included in the third AC voltage, and three second terminals connected to the load,
the first reference voltage is lower than a voltage twice a peak value of the first AC voltage, and
the second reference voltage is equal to or higher than the voltage twice the peak value of the first AC voltage.

4. The uninterruptible power supply apparatus according to claim 3, wherein
the first AC power supply is a commercial AC power supply, and
the second AC power supply is a power generator.

5. The uninterruptible power supply apparatus according to claim 2, further comprising:
a selector that selects one mode of the first and second modes;
a signal generating circuit that outputs a switch command signal in response to a mode selected by the selector being changed from one mode to the other mode; and
a timer that successively measures a first time, a second time, and a third time, in response to the switch command signal, wherein
in the switching period, the first controller executes the third mode from when the first time is measured by the timer to when the second time is measured by the timer, and
in the switching period, the second controller passes the second AC current from the first AC power supply to the rectifier from when the switch command signal is output to when the third time is measured by the timer.

6. The uninterruptible power supply apparatus according to claim 5, wherein
the second controller includes
a gain generating circuit that outputs the first gain in the first and second modes, and outputs the second gain from when the switch command signal is output to when the third time is measured by the timer,
a reference voltage generating circuit that outputs the first reference voltage in the first and second modes, and outputs the second reference voltage from when the switch command signal is output to when the third time is measured by the timer, and
a voltage detector that detects the terminal-to-terminal voltage of the capacitor, and
the second controller
obtains the first and second feed forward components based on a product of the load current and a gain output from the gain generating circuit, and obtains the first and second feedback components based on deviation between output voltage from the reference voltage generating circuit and a detected value from the voltage detector.

7. The uninterruptible power supply apparatus according to claim 1, further comprising a bidirectional chopper that stores DC power generated by the rectifier in a power storage device in a sound state of the first AC power supply, and supplies DC power in the power storage device to the inverter at a time of a power failure of the first AC power supply.

8. An uninterruptible power supply apparatus comprising:
a rectifier that converts first AC voltage supplied from a first AC power supply to DC voltage;
a capacitor that smooths DC output voltage from the rectifier;
an inverter that converts terminal-to-terminal voltage of the capacitor to second AC voltage;
a first switch having a first terminal receiving the second AC voltage and a second terminal connected to a load;
a second switch having a first terminal receiving third AC voltage supplied from a second AC power supply and a second terminal connected to the load;
a first current detector that detects AC current flowing between the first AC power supply and the rectifier;
a second current detector that detects load current;
a first controller that controls the first and second switches; and
a second controller that controls the rectifier based on results of detection by the first and second current detectors, wherein
the first controller
(i) in a first mode in which the second AC voltage is supplied to the load, turns on the first switch and turns off the second switch,
(ii) in a second mode in which the third AC voltage is supplied to the load, turns on the second switch and turns off the first switch, and
(iii) in a switching period in which one mode of the first and second modes is switched to the other mode, turns on the first and second switches and executes a third mode in which the second and third AC voltages are supplied to the load, and
the second controller
(iv) passes AC current from the first AC power supply to the rectifier such that the terminal-to-terminal voltage of the capacitor becomes a reference voltage, the AC current including a feedback component having a value corresponding to deviation between the reference voltage and the terminal-to-terminal voltage of the capacitor, and a feed forward component obtained by multiplying the load current by a gain, and
(v) when the terminal-to-terminal voltage of the capacitor exceeds the reference voltage, reduces the gain in accordance with a difference between the terminal-to-terminal voltage of the capacitor and the reference voltage,
to prevent the terminal-to-terminal voltage of the capacitor from exceeding an upper limit voltage higher than the reference voltage.

9. The uninterruptible power supply apparatus according to claim 8, wherein
the second controller is configured to
set the reference voltage to a first voltage value in the first and second modes, and set the reference voltage to a second voltage value higher than the first voltage value in the switching period,
to prevent circulating current from flowing from one AC power supply of the first and second AC power supplies to the other AC power supply through the capacitor.

10. The uninterruptible power supply apparatus according to claim 9, wherein
each of the first and second AC power supplies includes a three-phase AC power supply start-connected to a neutral point,
both of neutral points of the first and second AC power supplies are grounded,
each of the first to third AC voltages includes three-phase AC voltage,
the first switch includes three first terminals receiving the three-phase AC voltage included in the second AC voltage, and three second terminals connected to the load,
the second switch includes three first terminals receiving the three-phase AC voltage included in the third AC voltage, and three second terminals connected to the load,
the first voltage value is lower than a voltage twice a peak value of the first AC voltage, and
the second voltage value is equal to or higher than the voltage twice the peak value of the first AC voltage.

11. The uninterruptible power supply apparatus according to claim 10, wherein
the first AC power supply is a commercial AC power supply, and
the second AC power supply is a power generator.

12. The uninterruptible power supply apparatus according to claim 9, further comprising:
a selector that selects one mode of the first and second modes;
a signal generating circuit that outputs a switch command signal in response to a mode selected by the selector being changed from one mode to the other mode; and
a timer that successively measures a first time, a second time, and a third time, in response to the switch command signal, wherein in the switching period, the first controller executes the third mode from when the first time is measured by the timer to when the second time is measured by the timer, and
in the switching period, the second controller sets the reference voltage to the second voltage value from when the switch command signal is output to when the third time is measured by the timer.

13. The uninterruptible power supply apparatus according to claim 12, wherein
the second controller includes
a gain generating circuit that sets the gain to a first value when the terminal-to-terminal voltage of the capacitor is lower than the reference voltage, and sets the gain to a second value lower than the first value by reducing the gain in accordance with a difference between the terminal-to-terminal voltage of the capacitor and the reference voltage when the terminal-to-terminal voltage of the capacitor is higher than the reference voltage,
a reference voltage generating circuit that sets the reference voltage to the first voltage value in the first and second modes, and sets the reference voltage to the second voltage value higher than the first voltage value from when the switch command signal is output to when the third time is measured by the timer, and
a voltage detector that detects the terminal-to-terminal voltage of the capacitor, and
the second controller
obtains the first and second feed forward components by multiplying the load current by the gain set by the gain generating circuit, and
obtains the first and second feedback components based on deviation between the reference voltage set by the reference voltage generating circuit and a detected value from the voltage detector.

14. The uninterruptible power supply apparatus according to claim 8, further comprising a bidirectional chopper that stores DC power generated by the rectifier in a power storage device in a sound state of the first AC power supply, and supplies DC power in the power storage device to the inverter at a time of a power failure of the first AC power supply.

* * * * *